May 5, 1936.　　　S. L. KERR　　　2,039,426
APPARATUS FOR CONTROLLING PRIME MOVERS
Filed March 26, 1931　　　6 Sheets-Sheet 2
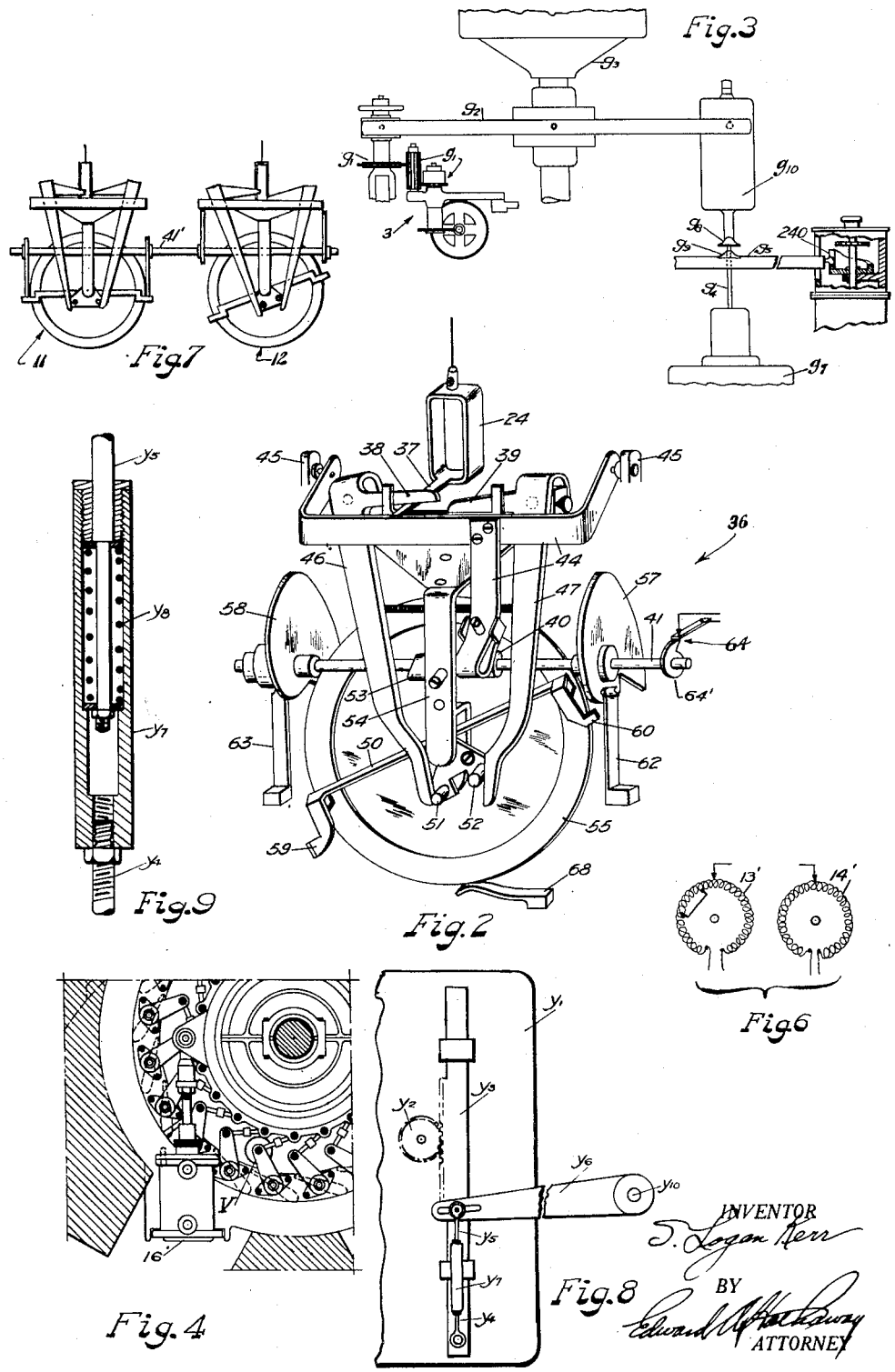

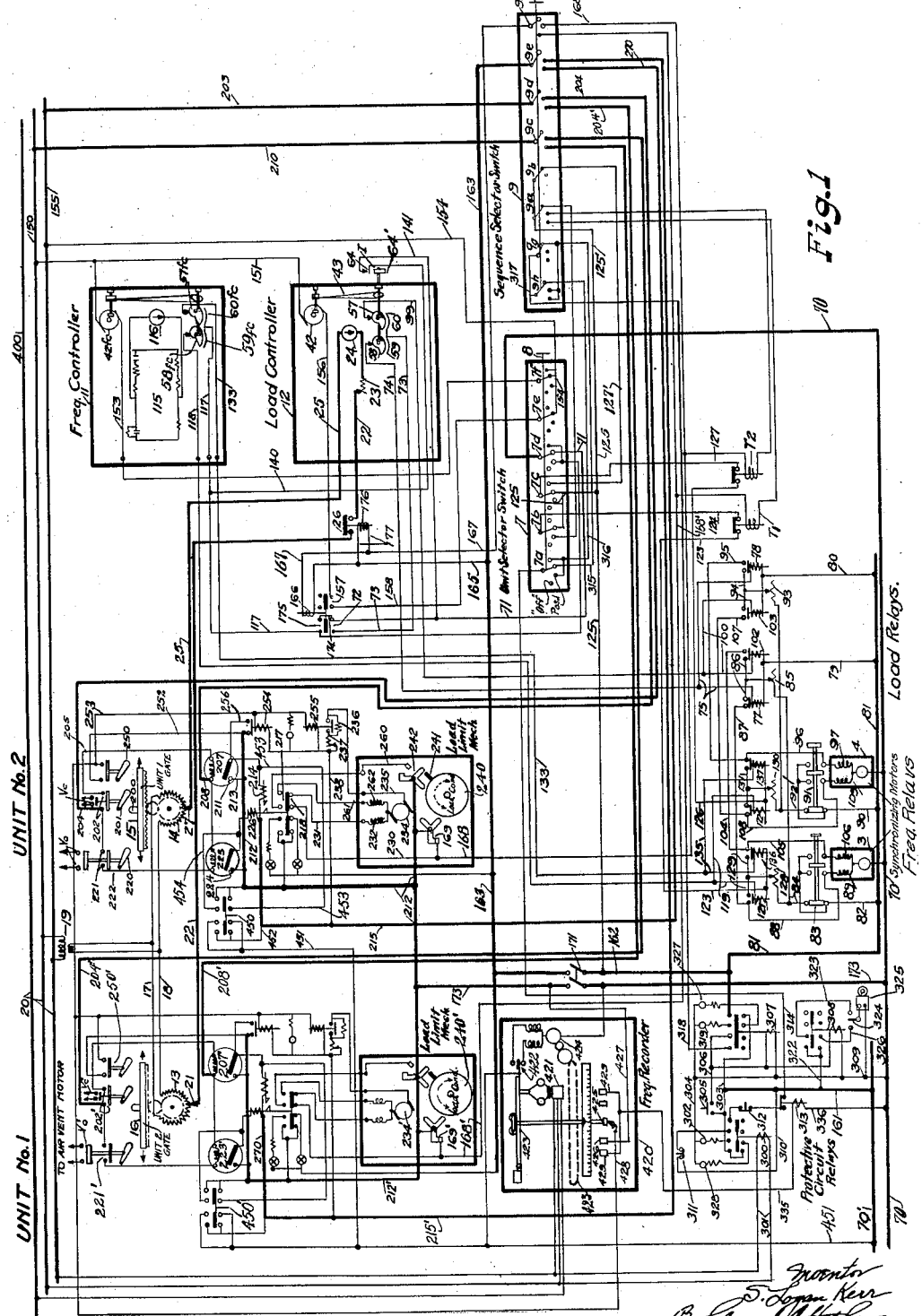

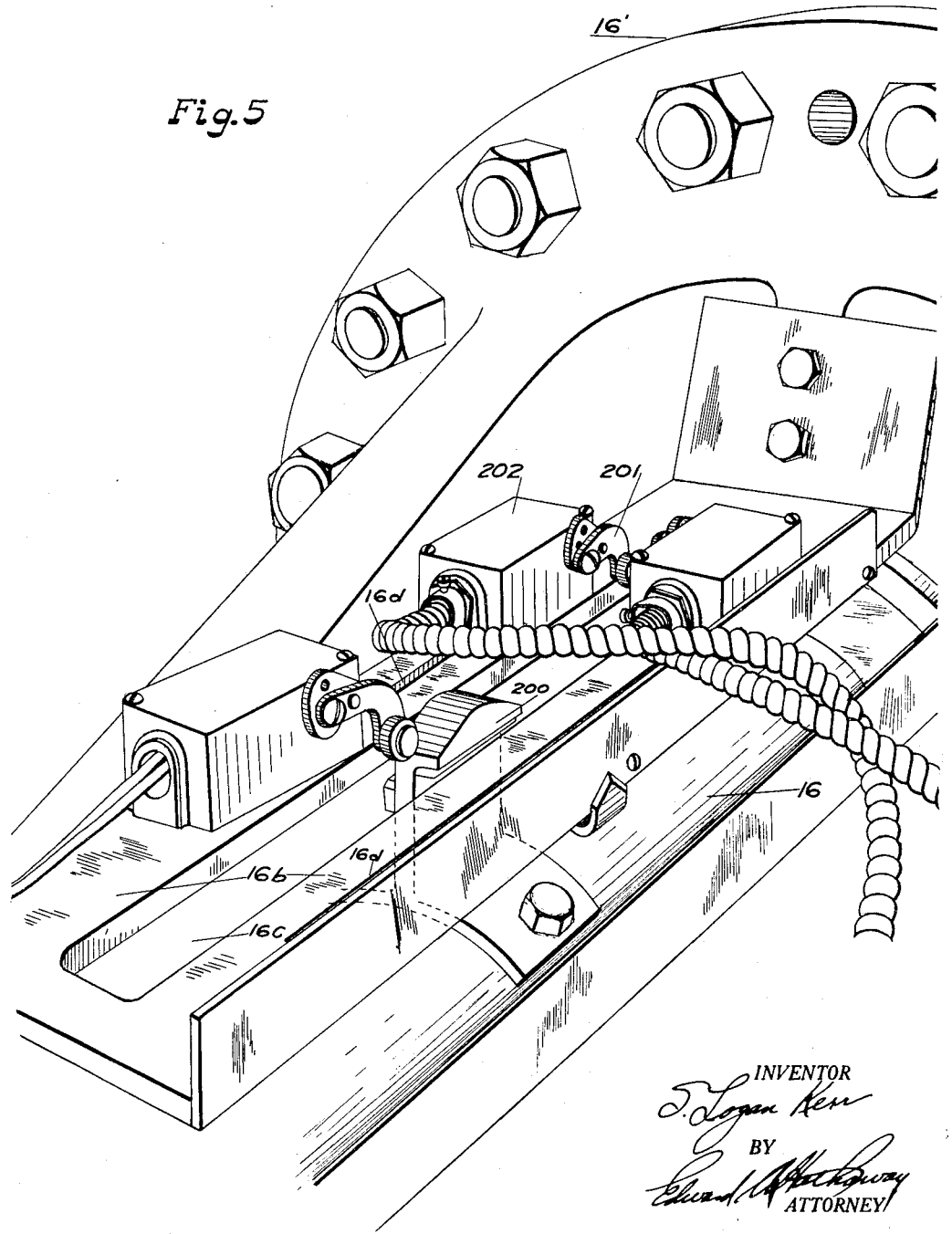

Patented May 5, 1936

2,039,426

UNITED STATES PATENT OFFICE 2,039,426

APPARATUS FOR CONTROLLING PRIME MOVERS

Samuel Logan Kerr, Philadelphia, Pa.

Application March 26, 1931, Serial No. 525,355

39 Claims. (Cl. 290—4)

This invention relates to an improved method and apparatus for effecting automatic frequency control and automatic economic load control of an electric generating station having a plurality of units.

In controlling the frequency of an electric generating system the load is adjusted on one or more of the generating units of that system to adjust for the differences between the demand and available supply. By providing, as in the specific aspect of the invention, a controller arranged to be sensitive to variations in frequency and to make contacts following its response to said variations it is possible to energize the load adjusting motors on the prime mover governors in such a manner as to increase or decrease the output of these units to correct for the difference in frequency to which the controller responded. In addition to controlling frequency it is necessary also to control the distribution of load between the units in service in such a manner that the conditions for maximum combined economy are satisfied. On units having identical characteristics an equal distribution of load between them will satisfy the condition for maximum combined economy, while for units having different characteristics a definite relation between the unit loadings can be established from the knowledge of the unit characteristics. By applying improved means to the control of these units so that this relation is automatically maintained then the load distribution between units will be in accordance with the requirements for maximum economy at all times.

By supplying frequency control impulses to all units in the station, the combination of units will increase or decrease their individual output simultaneously in accordance with the change in demand caused by the action of the frequency controller. This will insure a more rapid and positive adjustment of the frequency than would be the case if a single unit in the station received the control impulses alone. With the combination of units receiving control impulses for frequency correction simultaneously, the distribution of load between the various units may tend to depart materially from the economy combination. However, with my improved control means arranged to be sensitive to differences in output between the units or to departures of the load of the units from the economic schedule, the combination of these controls with the frequency controller will result in having the frequency control of the station simultaneous with a predetermined load distribution between units, this predetermined load distribution being such as to give substantially the best economic operation.

In addition to this feature the demand for load adjustment in response to changes in frequency may vary the station load through fairly wide ranges so that a condition will result where the output of the station could be more economically carried on a fewer number of units than those already in service, and hence there would be one or more units which represent a surplus over the requirements for economic operation. The reverse is also true, namely, that the load may increase to such an extent that the demand exceeds the economic capacity of the units in service and one or more additional units would be required. To meet this condition a special controller is arranged whereby the surplus units are carried as synchronous condensers which are motored from the line especially in the case of hydro-electric units for these can be placed on load very rapidly without danger of damage. In this invention these controls are arranged so that the surplus units, normally operating in reserve, will be transferred to load when required due to the passing of the economic limit of the units already carrying the station output.

With further control means, the reserve unit or units can be brought onto load through the action of suitable contacts placed at the proper point in the gate opening of the unit on load or on a frequency-sensitive instrument on which the point of contact is set at the desired value below normal speed. The rate of transfer to load in such a case could be increased materially over the rate of transfer for normal service, thus making the reserve units immediately available for emergency service. Thus with two units in service and a third in reserve should the demand on the station exceed the economic capacity of the two units in service, control means are actuated whereby a third unit is transferred from synchronous condenser operation to load, and would share the demand with the original two units. On the other hand, if the demand decreased until the economic point for three units in service was passed, the third unit is transferred automatically to synchronous condenser operation and held in reserve while the station load is carried by the two original units. This method of operation will also transfer the second unit to condenser service if the demand falls below the economic limit for two units, thus leaving one unit to carry the load with two units in reserve. This provides for the progressive transfer between load and condenser for any number of units to maintain the economic combination of units on load. In this manner frequency control can be maintained on any given generating station, particularly in hydro-electric plants, and simultaneously with the frequency control there can be economic load distribution between units and the control of the economic number of units in service with the remaining surplus units operating as synchronous condensers. Also, if desired, surplus units may be shut down and started up as they are required, this being accomplished by additional control mechanism, although in such a case, the reserve units would not be available for service as promptly as would the reserve units operating as synchronous condensers. There may be provided, if desired, a combination of these two systems arranged whereby one unit can be held in reserve and the additional surplus units shut down and started up as the reserve unit is called into play, or is taken off load. Thus the case might be that two units are operating on load with the third unit in reserve and the fourth shut down. As the third unit is required for load the fourth unit would automatically start up and be placed in reserve ready for service in case it is required. In the latter instance, it would automatically go on load, and as the demand dropped off would go into reserve until the third unit became unnecessary, at which time the third unit would go into reserve and the fourth unit would be shut down.

This application, in one specific aspect of the invention, refers particularly to the arrangement of a hydro-electric plant having two units of equal capacity and of identical characteristics to which frequency control has been applied, in combination with the automatic distribution of load between units in accordance with the requirements for maximum combined economy, and also with the economic carrying of the system reserve capacity by transferring one unit from load to condenser service or from condenser to load in accordance with the requirements for best efficiency.

Other objects and advantages will be clear to persons skilled in the art from the following description of the accompanying drawings, in which:

Fig. 1 is a wiring diagram of one form of my improved combination;

Fig. 2 is a perspective of a galvanometer controlled contact-making device used as an element in my improved combination;

Fig. 3 is a partial elevational view of a governor shown in a co-pending application of mine Serial No. 301,374, filed August 22, 1928 and included herein as one form of governor that may be used with my improved control;

Fig. 4 is quarter horizontal sectional view of a hydraulic turbine showing usual wicket gates in dotted lines and usual gate operating mechanism;

Fig. 5 is a fragmentary perspective of a gate operating servo-motor with the transfer switches shown mounted on a bracket which overlies the piston rod;

Figures 11, 12:
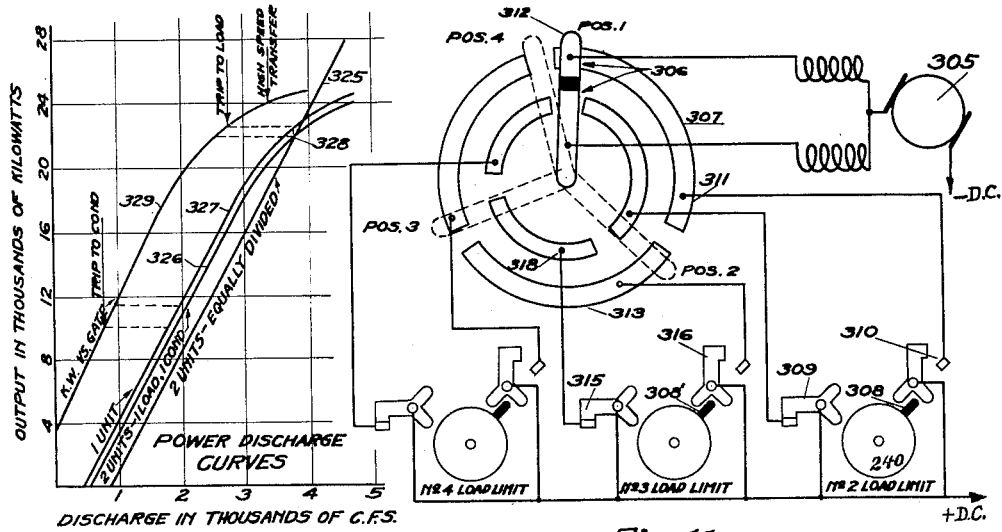
Figure 10:
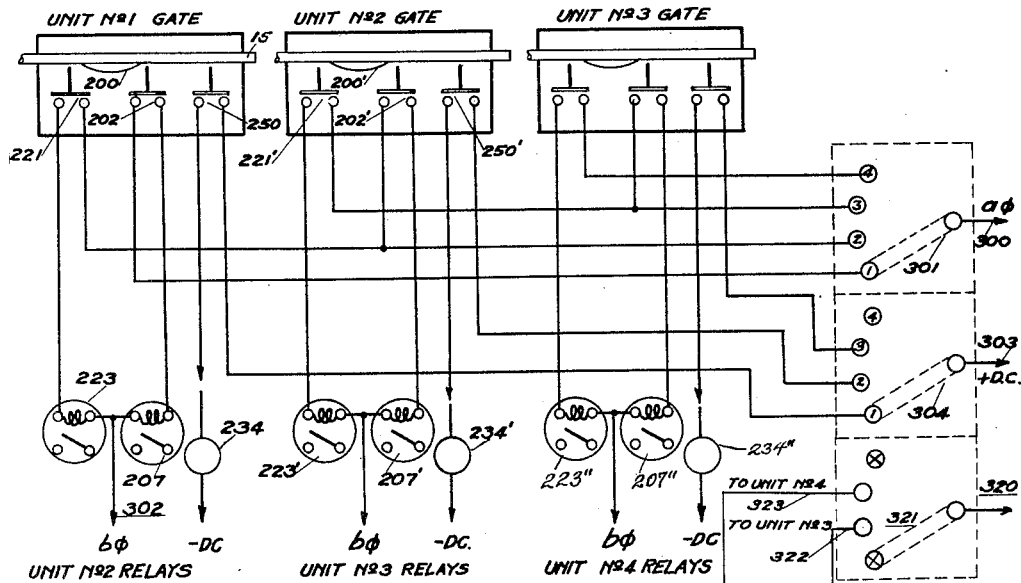
Figure 13:
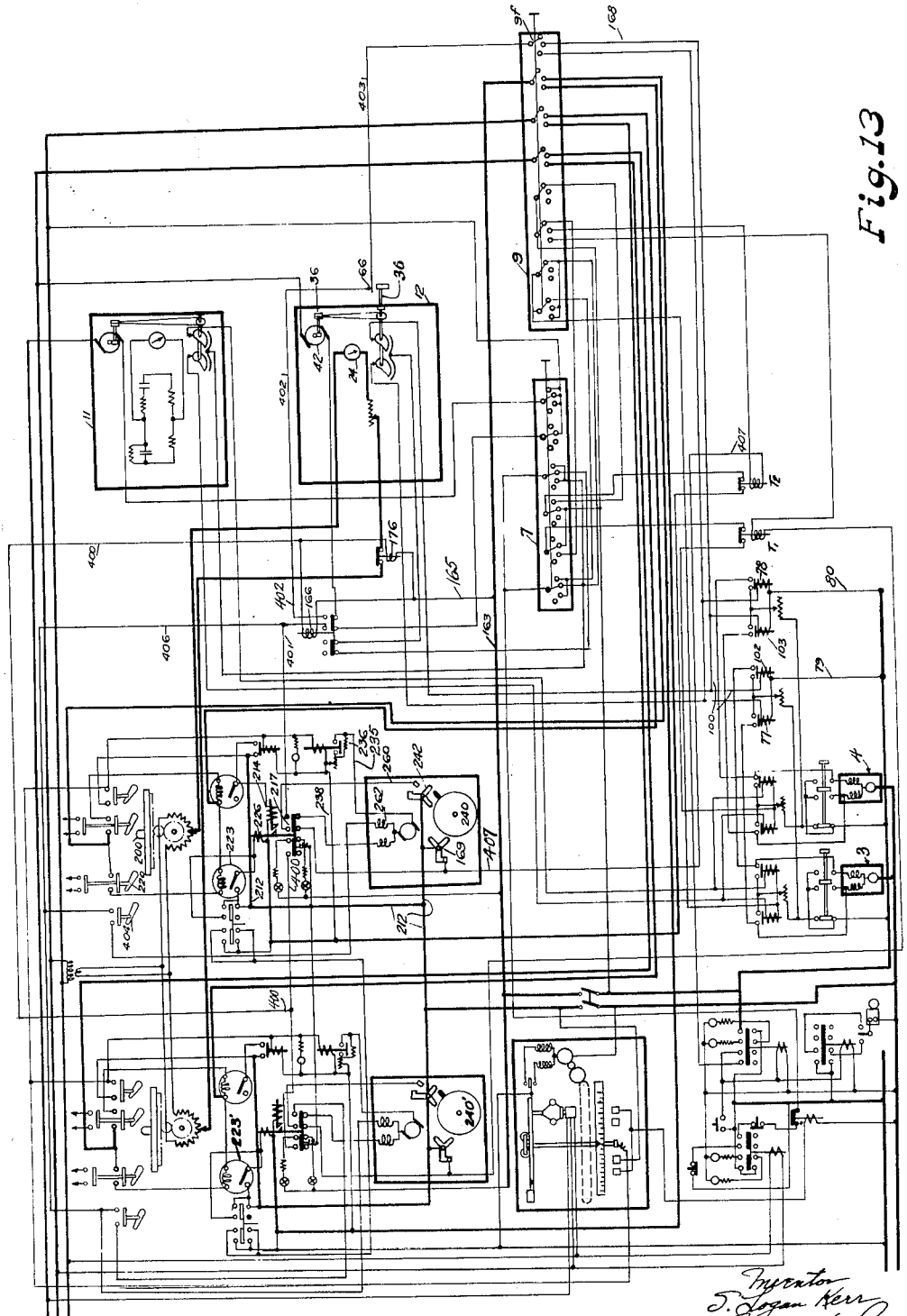
Figure 14:
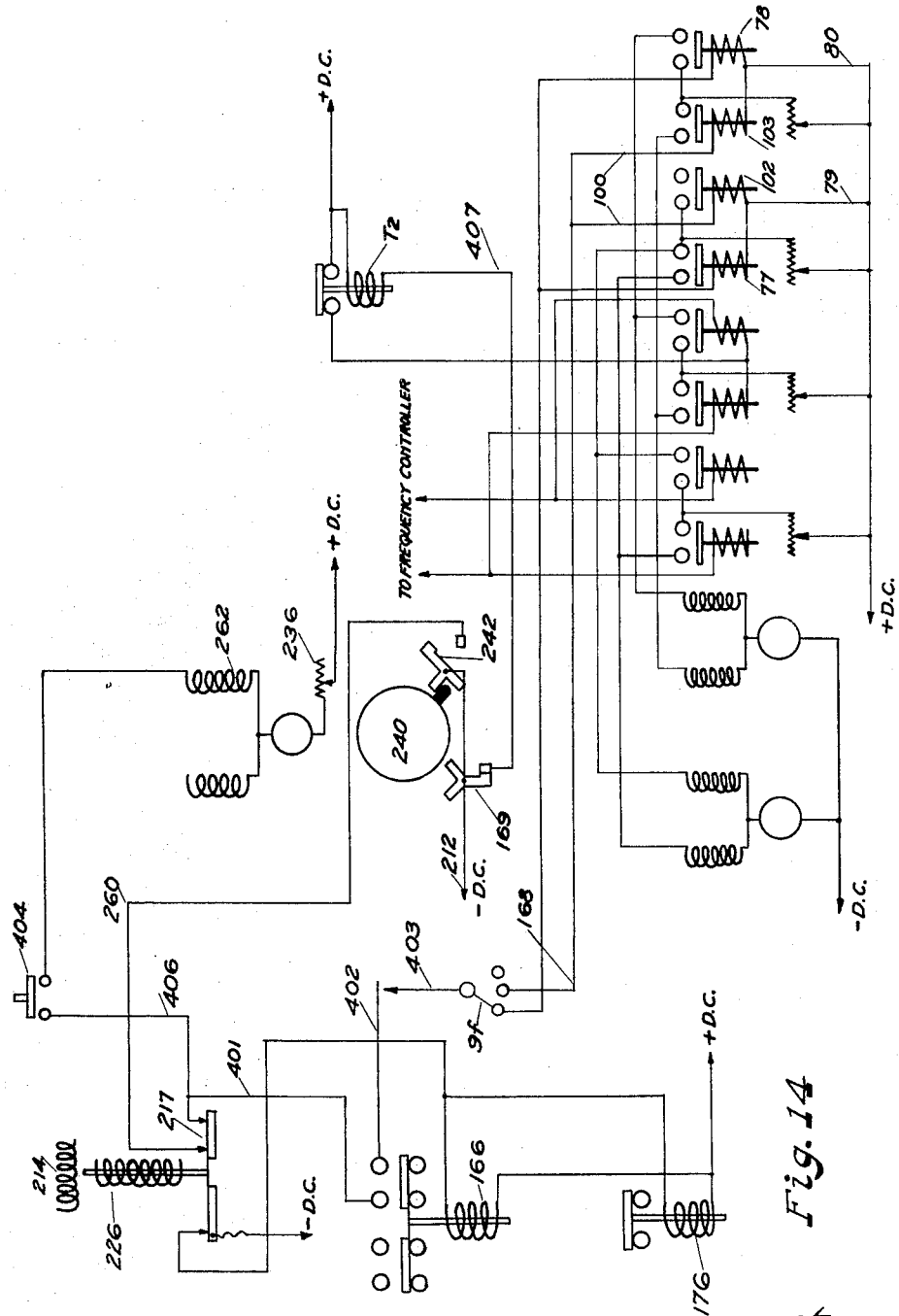

Fig. 6 diagrammatically shows resistances adapted for units of dissimilar characteristics;

Fig. 7 is a modification diagrammatically illustrating a common shaft drive between the frequency and load controllers thereby insuring non-interference between their respective control impulses even though the instruments are simultaneously operated;

Fig. 8 illustrates an arrangement for actuating the load responsive variable resistances for the galvanometer bridge circuit;

Fig. 9 is a vertical sectional view of the yieldable coupling $y_7$ in Fig. 8;

Figs. 10 and 11 illustrate diagrammatically my improved transfer system applied to a four unit installation with means for completely shutting down a unit already on reserve when a second unit is thrown on reserve, thereby avoiding having too many units on reserve, or vice versa, i. e. starting up units;

Fig. 12 shows curves for determining the points of economic transfer;

Fig. 13 is a wiring diagram for permitting the synchronizing or load adjusting motor, instead of the load limit motor, to be used for decreasing the load on a unit when it is to be transferred from load to condenser; and Fig. 14 is an isolated wiring diagram for operating the synchronizing motor in the Fig. 13 arrangement.

Figures 15, 16:
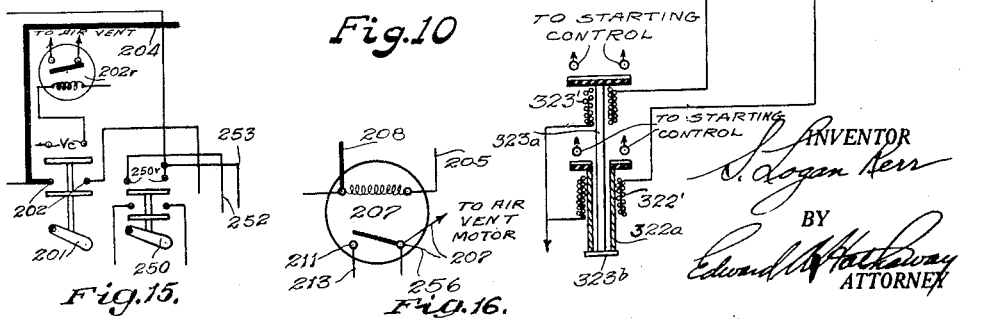

Fig. 15 is a modification showing a time delay relay inserted in the circuit of the air vent motor;

Fig. 16 is a further modification showing the air vent motor circuit controlled directly by the time delay relays which also control the transfer operations.

For purposes of illustrating the invention as applied to prime movers, it will be specifically described and shown in connection with two hydroelectric units Nos. 1 and 2. The turbines for these units are provided with any usual or desired types of mechanism for controlling flow of fluid to the runners, which in the case of the reaction turbines may be wicket, plunger or cylinder gates, or in the case of impulse turbines they may be of the adjustable needle nozzle type, or a nozzle provided with a deflector if desired, or any combination of these mechanisms. In case the prime movers are steam turbines or internal combustion engines, the mechanism for controlling flow of the power medium thereto would be any of the devices such as are usually employed with these types of prime movers.

In each case, however, the flow control mechanism would be suitably actuated by power, the power mechanism being of the reversible type, such as a hydraulically actuated piston and cylinder motor or an electric motor, so as to permit the flow mechanism to be either opened or closed with equal facility. In the case of a hydro-electric unit the turbine gates are controlled by any suitable type of speed governor, one form of which is shown in my co-pending application, Serial No. 301,374, filed August 22, 1928. It may be considered herein that the type of governor as shown in said co-pending application is employed in connection with my present apparatus. Each unit is provided with such a governor a portion of which is diagrammatically shown in Fig. 3 the governors each having synchronizing or load adjusting units 3 and 4 respectively, preferably of the reversible electric motor type having relative high rotative speed, and proper gearing $g_1$ to control the positioning of the left end of a floating lever $g_2$ which is pivotally supported on the floating collar of the centrifugal head $g_3$, this head, as is usual, being driven by the prime mover. The other end of the floating lever is pivotally connected to a pilot valve stem $g_4$ which freely passes through a load limit control lever $g_5$. This lever is connected at its left end (not shown) to usual restoring mechanism while its right end rests upon the upper surface of a load limit cam 240. This cam is supported for rotation about a vertical axis and is driven by the reversible load limit motor 234 through any suitable gearing such as is shown in my said copending governor application. As the cam is rotated in one direction it raises the right end of lever $g_5$ to any predetermined position and in so doing prevents the pilot valve, generally indicated at $g_7$ from being moved downwardly below a predetermined point by the centrifugal head due to a collar $g_8$ formed on the pilot valve stem engaging a stop $g_9$ formed on lever $g_5$. The prime mover is fully shut down when the load limit cam is rotated to such an extent that the pilot valve is raised to the point where it is unable to control the valve passages. The pilot valve may be raised even though the floating lever $g_2$ and governor head $g_3$ should remain in a fixed position or tend to move in a direction opposite to the action of the load limit cam, this being due to the provision of a double acting spring contained in a casing $g_{10}$. When the motor-operated load limit cam is rotated fully to its opposite direction lever $g_5$ is lowered so that the stop $g_9$ cannot in any way engage collar $g_8$ thereby leaving the pilot valve entirely under the control of the centrifugal head. As is usual cam 240 is also manually rotatable and can be adjusted to any intermediate point to definitely limit the output of its particular unit. Under normal conditions however the cam is either in full open or closed position.

*Type 1-A operation. Both units on load with station frequency control. Economic load distribution between the units.*—To obtain economic load distribution between the units while at the same time permitting the combined output of the two units to be raised or lowered in order to maintain normal frequency, unit selector switch generally indicated at 7, Fig. 1, is placed in its second position. This switch comprises several switch sections, the movable switch elements of which are connected for simultaneous movement to a common operating member diagrammatically illustrated at 8. Each switch section has four positions the contacts for which are arcuately grouped about the pivot of their movable switch. The first contact to the left of each group is the off position, the second contact is position I, etc. It will of course be understood that the commercial form of this switch may be of any one of various types suitable for such work. A sequence selector switch generally indicated at 9, which may be of the same general construction as the unit selector switch, is placed in its third position which is the third contact from the left of each group of contacts, there being no off position. All of the movable switch elements of the selector switch are simultaneously actuated by a common member 10.

With the unit and sequence selector switches in their positions II and III respectively and should the system frequency increase due to a decreased load demand, thereby necessitating a decrease in the combined output of the units, a frequency controller generally indicated at 11 will function so as to transmit frequency control impulses simultaneously to each of the load adjusting motors 3 and 4, which in turn adjust the governor pilot valves of each unit thereby causing the gate mechanisms to decrease the output of both units.

During changes in the combined output it is essential in this specific disclosure, in order to maintain equal division of load between the similar units and therefore maximum combined efficiency, that the load on each unit should be increased or decreased by the same amount. This assumes that the performance characteristics of power, discharge and efficiency of the respective units, are practically identical. With units of dissimilar characteristics the load is proportionally divided in accordance with the unit characteristics to secure maximum economy, this being in accordance with the disclosure in my earlier filed automatic control application referred to herein.

*Load controller.*—To accomplish this division of load there is provided a load controller, generally indicated at 12. This instrument per se, which I have specifically shown herein merely for purposes of illustration, is with certain exceptions to be noted later, of a well known manufacture. In my particular combination of elements, in which I have embodied this instrument, the instrument is arranged to function as a load controller to transmit load control impulses to each of the load adjusting motors 3 and 4, which in turn are inter-connected through relay controls so that if the load is not equally divided between the units that unit having the greater load will be adjusted to decrease its load while the other unit will have its load increased simultaneously until the two are balanced.

To determine the power output of each unit any one of various load recording or indicating devices such as watt meters may be employed although in the specific embodiment herein disclosed it is preferred to obtain an indication of the unit output by the position of the turbine gates, it being understood that in the case of hydraulic turbines of substantially the same power capacity and performance characteristics, if the gates of the respective turbines have the same percentage of opening the load will be divided equally between them in the most economical manner. This assumes, of course, that the speed of the two units will be the same, as of course it will be in the case of the synchronous generators herein considered. To determine automatically when there is not an equal division of load there are provided gate opening transmitters, specifically herein in the form of movable resistances 13 and 14 connected respectively to the gate mechanisms 15 and 16 of units Nos. 1 and 2 respectively. Elements 15 and 16, referred to as gates, are preferably the gate rods, or piston rods of the usual gate operating servo-motors of the piston and cylinder type 16' Figs. 4 and 5 although any other portion of the gate mechanism may be connected through suitable linkages or gearing to actuate elements similar or equivalent to elements 15, 16, the actuation thereby being proportionate with the gate position. These various arrangements are generally referred to herein as gate or load indicating mechanism for the reason that they all perform the function of indicating the unit output.

The resistances are preferably of the circular type rotatably driven upon movement of the gates 15 and 16 through any suitable driving mechanism which, merely for purposes of illustration in the wiring diagram, is shown in the form of gears. The gear ratio is of course assumed to be such that for full longitudinal movement of the gate rods their respective resistances will be rotated so that the full length of the resistance passes a given point. Suitable mechanism is provided to effect adjustment of the zero and full gate positions of these resistances and also to adjust the travel to equal that of the gate mechanism, such adjustments usually being required in the completed installation to compensate for inaccuracies of construction. One form of mechanism actually used will be described later. These resistances are connected in parallel as by wires 17 and 18 and potential maintained thereon as from a potential transformer 19 which is connected to one phase of the alternating current lines 20. As shown in this application three phase current is used but single phase current can be employed if desired.

A galvanometer bridge circuit connected across resistances 13 and 14 comprises a normally stationary contact or terminal 21 slidably engaging the periphery of resistance 13, wire 22, manually adjustable resistance 23, galvanometer 24 and wire 25, there being provided in wire 22 a normally closed relay 26. Wire 25 leads back to the other resistance 14 as through a normally stationary contact 27 which also slidably engages the resistance periphery.

From the arrangement so far described it is seen that if the two units have the same percentage of gate opening, the elements 15 and 16 will have the same extent of displacement and the resistances 13 and 14 will accordingly have the same degree of angular displacement from a zero point, and hence there will be no potential difference at contacts 21 and 27. However, if one unit has a greater percentage of gate opening its resistance will not have the same angular displacement as the other resistance and hence a potential difference will exist between contacts 21 and 27 resulting in current flow through the galvanometer in one direction or the other depending upon whether the greater potential is at 21 or 27. The galvanometer will deflect in one direction or the other in accordance with the direction of current flow therethrough.

To transmit the effect of any galvanometer deflection the load controller as shown in Fig. 2 is provided with a contact making device generally indicated at 36 and is arranged so that when the galvanometer circuit has no current flowing therethrough the zero or balanced position of the galvanometer pointer 37 lies directly under a gap between the adjacent ends of transversely pivoted levers 38 and 39. In Fig. 2 the galvanometer is shown deflected from its zero or balanced position. A cam 40, on a cam shaft 41, is continuously driven (Fig. 1, load controller 12) by a motor 42 through any suitable means diagrammatically shown as a belt and pulley or chain and sprocket connection 43. Rotation of cam 40 raises a rocker arm 44 including a U-shaped member which is horizontally pivoted at 45. The galvanometer pointer extends forwardly over the top edge of the U portion of rocker arm 44 and if the galvanometer pointer is under the gap between adjacent ends of arms 38, 39 upward movement of rocker arm 44 will merely move the galvanometer pointer upwardly into this gap without moving arms 38, 39. However, if the galvanometer is deflected, for instance, to the left as shown in Fig. 2, it will lie beneath arm 38 and above the edge of rocker arm 44 whereupon vertical movement of rocker arm causes the galvanometer pointer to be caught and held between 44 and 38 thereby swinging arm 38 upwardly. As arm 38 moves, it swings its integrally connected arm 46 which in turn moves a transversely pivoted cross-arm 50 as by engaging a pin 51 mounted on a bracket carried by the arm 50.

Another pin 52 cooperates with a similar arm 47 which is connected to the arm 39.

When rocker arm 44 rises a cam 53 simultaneously moves an arm 54 outwardly together with its pivoted cross-arm 50, away from a disk 55. On the next half revolution of cam shaft 41, cam 53 permits arm 54 to move back toward disk 55 likewise carrying cross-arm 50 which in its tilted position, as shown, will now frictionally engage disk 55. By the time this frictional engagement is effected, shaft 40 has rotated cams 57 and 58 so that one or the other engages fingers 59 or 60 to move cross-arm 50 back to its horizontal position. During this movement disk 55 which is preferably normally stationary, has arms 59 or 60 move over the face thereof and in contact therewith. If desired, however, disk 55 may rotate with cross-arm 50. As to whether one or the other of these operations are employed depends upon the particular use to which the instrument is put. Cams 53 and 40 rotate together so that rocker arm 44 releases its hold on galvanometer pointer 37 after the frictional contact has been made, thereafter permitting arm 46 to be returned to its neutral position by pin 51, attached to cross-arm 50, during return of the cross-arm to its neutral position by cam 57. Upon release of the galvanometer pointer 37 if a potential difference still exists at contacts 21 and 27, Fig. 1, the galvanometer will still remain in a deflected position, so that the above cycle of operation is repeated on the next revolution of the continuously rotating cam shaft 41. If the galvanometer current flows in an opposite direction, cross arm 50 is oppositely deflected by the short leg 39 of lever 47 through pin 52, it being understood that the galvanometer pointer 37 can move between arm 39 and rocker arm 44 in the same manner as with arm 38. Cross arm 50 upon being so deflected will now be returned to its horizontal position by cam 58 contacting with finger 59.

From the above it is seen that depending upon the direction of current flow in the galvanometer circuit one or the other of cams and fingers 57, 60 or 58, 59 will have intermittent contact with each other until through adjustment of the unit gates the galvanometer current is reduced to zero in which case the galvanometer pointer will have been returned to the gap between the adjacent ends of arms 38 and 39. However, as the galvanometer pointer gradually moves toward its neutral point, due to diminishing current in the galvanometer circuit, the length of time of contact between either cam and its cooperating finger becomes correspondingly shorter. This is because the amount that arm 50 is rotated through pins 51 or 52 depends upon the magnitude of the galvanometer deflection. As the deflection decreases the pointer moves away from the fulcrum of levers 46 and 47 and hence effects successively smaller movements of arms 38 for a given upward movement of rocker arm 44. In my improved apparatus, I not only use this intermittent contacting as through stationary brushes 62 and 63 slidably engaging and having electrical contact with cams 57 and 58 which are suitably insulated from and fixed to cam shaft 41, but I also provide a special set of intermittently operated contacts comprising, as diagrammatically shown in Fig. 2, a cam 64 secured to and insulated from cam shaft 41. This cam is preferably angularly related with respect to cams 57 and 58 so that contacts 66 and 60 close alternately even though cams 57 and 58 have a variable length of time of contact with fingers 59 or 60.

A common or neutral contact 68, diagrammatically shown as engaging the disk, completes a circuit with brushes 62 or 63 by means of elements 58, 59 or 57, 60.

*Operation of economic load distribution between units.*—Assuming that both units are operating and that the load is equally divided therebetween for maximum combined efficiency, if the system load should, say, increase, the speed governors would respond in the usual manner to open the gates on both units thereby increasing the power output. If for some reason one turbine should not respond as quickly as the other due to possible sluggish action of the equipment it is seen that the ideal load distribution would not be maintained. However, this would only be temporary due to the fact that a potential difference would immediately exist between contacts 21 and 27 resulting in current flow through galvanometer 24 in one direction or the other and accordingly set into operation the intermittent contacts 58, 59, or 57, 60 depending upon the relative correction needed between the units. For instance, if unit No. 1 is temporarily carrying a greater load than unit No. 2, unit No. 1 will be corrected in a downward direction and unit No. 2 in an upward direction, or vice versa if conditions are reversed. If the load on the units rises together at the same rate no relative correction between them will be necessary because the resistances 13 and 14 will be maintained in such relation that no potential difference will exist at contacts 21 and 27. The same is also true if the loads on the units fall together at the same rate.

*Economic operation continued (load control relays).*—Assume that it is necessary to lower the load on unit No. 1 and to raise the load on unit No. 2. In response to this condition a difference in potential at contacts 21 and 27 will exist so as to cause the galvanometer pointer to deflect automatically beneath arm 39, Fig. 2, whereupon cam 58 and finger 59 intermittently contact. As shown in Fig. 1, intermittent closure of these contacts causes load control or correction impulses to be transmitted to the load adjusting motors 3 and 4 as follows: Following toward the right (lower left corner) along a main supply lead 70, direct current passes therefrom through unit selector switch element 7d in position II, wire 71, closed contacts 72, neutral lead 73, cam and finger contacts 58, 59, wire 74, thence through parallel wires 75 to energize and close lowering-relay 77 for unit No. 1 and also to energize and close raising-relay 78 for unit No. 2, these being connected by wires 79 and 80 to a supply wire 81 which in turn is connected to the other main control lead 70' through a portion of a protective circuit to be described later. It is thus seen that the lowering-relay 77 of unit No. 1 is energized simultaneously with the raising-relay 78 of unit No. 2, thereby causing simultaneous opposite adjustment of the two units. For instance, closure of relay 77 permits current to flow from supply wire 81 through wire 82, across closed switch 83, wire 84, manually adjustable resistance 85, thence through a common wire 86, across the contacts of relay 77 through wires 87 and 88 to energize the lowering-field 89 of the load adjusting motor 3 which is connected to line 70 to complete the circuit.

For ease of understanding, it will be noted that in each pair of lowering and raising relays the lowering relay is on the left and the raising relays on the right and the same is also true of the lowering and raising fields of the motors 3 and 4.

The circuit for the raising-field of load adjusting motor 4 is from supply wire 81, through wire 90, closed switch 91, wire 92, manually adjustable resistance 93, common wire 94, across the closed contacts of relay 78, thence through wires 95 and 96 to energize the raising-field 97 of load adjusting motor 4 which is also connected to control lead 70 to complete the circuit.

If it happens that the load on the turbine units is unequally divided in a direction opposite to that previously considered thereby necessitating the units to be corrected in the reverse order from that above described, the galvanometer pointer will be deflected automatically in the other direction due to the potential unbalance between contacts 21 and 27. The deflected galvanometer needle will thereupon cooperate with arm 38 whereupon cam 57 and its cooperating finger 60 will contact to establish a circuit from neutral lead 73 through a wire 99 and parallel wires 100 to energize and close raising-relay 102 for the load adjusting motor 3 of unit No. 1 and also to energize lowering-relay 103 for load adjusting motor 4 of unit No. 2, these relays being connected as by wires 79, 80 to supply lead 81.

Closure of relay 102 establishes a circuit from manually adjustable resistance 85 through common wire 86, across closed contacts of relay 102, thence through wires 104, 105 to energize the raising field 106 of load adjusting motor 3. Simultaneously a circuit is established, by closure of relay 103, from resistance 93, through common wire 94, across closed contacts of relay 103, and thence through wires 107 and 108 to energize the lowering field 109 of load adjusting motor 4.

As the load adjusting motors are operated to actuate the pilot valves $g_7$ and thereby adjust the load until equally divided between the units, the gate rods or other load indicating mechanism for each unit will simultaneously readjust the resistances 13, 14 so that the potential at contacts 21, 27 is equal. Control impulses are then no longer transmitted.

*Economic load distribution between units of dissimilar characteristics.*—To obtain maximum economic load distribution between units having dissimilar performance characteristics, such as their discharge, power and efficiency relation, it is only necessary that when the two units are on load they should respectively operate at gate openings which would give maximum combined efficiency. For certain loads these gate openings may be the same while for other loads they may be different, or they may be different at all loads. In any case, however, the resistances 13, 14 are respectively proportioned so that a balanced potential at contacts 21 and 27 will not be obtained until the units are operating at the respective load or gate openings which will give the maximum combined efficiency. Resistances of the type suitable for operating dissimilar units at the maximum combined efficiency are shown in my copending application, Serial No. 408,544 and also at 13', 14', Fig. 6, it being understood that these resistances are designed in accordance with the relative operating characteristics of their respective units. The operation of dissimilar units in the present application is otherwise identical to the operation of the similar units specifically disclosed herein, except that manually adjustable resistances 128 and 130 (Fig.

1, above motors 3 and 4 and to be described later) and 85 and 93 may be set to give greater or less response to one unit if the requirements for economic load distribution call for one unit to vary its load in a greater or less proportion than the other. Each specific case requires different relations of resistances 13' and 14'; also different settings of 128, 130, 85 and 93, as required by the unit characteristics, described in detail in my copending application, Serial No. 408,544.

*Type 1-A cont'd. Simultaneous operation of frequency and load controllers.*—Upon any variation in system frequency from normal due to an increasing or decreasing load or any other cause, frequency controller 11 responds accordingly and transmits to load adjusting motors 3 and 4 frequency correction impulses alternately with the load correction impulses. The frequency controller as shown herein for purposes of illustration is provided with a frequency sensitive bridge generally indicated at 115, such as an impedance bridge consisting of an arrangement of condensers and non-inductive resistances, one pair in parallel and one in series. Variations in frequency above or below the normal setting, as determined by suitable adjustments of the bridge causes the bridge circuit to become unbalanced which results in deflection of a galvanometer 116 connected across the bridge. The bridge and galvanometer field are connected to any common alternating current power bus or lead of the system. The mechanical mechanism for cooperating with the galvanometer pointer upon deflection thereof is the same as described in connection with the load controller with the omission however, of cam 64 and its cooperating contacts. Hence, the same elements of the frequency and load controllers are given the same reference numbers but with the suffix letters fc to indicate the elements of the frequency controller.

Assuming that the system frequency or speed increases, thereby necessitating a decrease in plant output, the pointer of galvanometer 116 will deflect automatically so as to cause current flow from a neutral lead 117 (its connection to the direct current supply line 70 will be described later), through finger 59fc, cam 58fc, wire 118, thence through parallel wires 119 to energize and close lowering relay 121 for load adjusting motor 3 of unit No. 1 and also energize and close lowering relay 122 for unit No. 2. The circuit for relay 121 is continued through wire 123, across closed contacts of relay T₁, wire 124, switch element 7b in position II, thence down and to the left along wire 125 to wire 162, through a protective circuit to wire 161 and the direct current supply line 70'. The circuit for lowering relay 122 is completed through wire 126, closed contacts of relay T₂, wire 127, switch element 7c in position II, wire 125 and thence to the direct current supply line as described above. Upon closure of relays 121 and 122 the lowering fields 89 and 109 are simultaneously energized, field 89 receiving its current from supply wire 81, wire 82, switch 83, wire 84, resistance 128, common wire 129, contacts of relay 121 and wire 88 through lowering field 89 of motor 3 to the other supply wire 70. Lowering field 109 is energized by current from supply wire 81, thence through wire 90, switch 91, wire 92, resistance 130, common wire 131, across closed contacts of relay 122, wire 108, thence through the field 109 and motor 4 to the other supply wire 70.

It is thus seen that the output of both units will be decreased simultaneously by the intermittent frequency correction impulses effected through cam 58fc and finger 59fc, and these control or correction impulses will gradually decrease in length of time as the necessary correction is effected.

If the frequency should drop below normal thereby necessitating an increase in plant output the galvanometer 116 would deflect automatically in the opposite direction thereby causing cam 57fc to intermittently make contact with its cooperating finger 60fc and effect correction impulses on the load adjusting motors 3 and 4 to increase the plant output. The circuit for this is from neutral wire 117 through cam 57fc, wire 133, thence through parallel wires 135 to energize and close raising relays 136 and 137, the circuits for which are continued through wires 123 and 126 as previously described for the lowering relays 121 and 122. Closure of raising relays 136 and 137 causes simultaneous energization of raising fields 106 and 97, thereby increasing the load on each unit. The circuit for field 106 includes wires 129 and 105 while field 97 includes wires 131 and 96.

*Alternate control of frequency and load correction impulses. Type 1-A operation cont'd.*—In order to have the frequency and load controllers simultaneously operative and yet permit their correction impulses to be fully effective without interference with each other I have provided improved means whereby the frequency and load correction impulses will alternate in controlling the load adjusting motors. It is of course to be understood that these alternating impulses successively follow each other at relatively close intervals depending upon the rate of rotation of cams 58, 58fc, etc. To accomplish this in one specific embodiment of the invention as shown herein, the frequency impulses are automatically cut out during transmission of load control impulses and vice-versa. This is accomplished even though the continuously rotating cams of the frequency and load controllers are not mechanically connected in some angularly offset relation or otherwise operated in synchronism, as shown in the alternative arrangements. As shown in Fig. 7 the frequency and load controllers are placed end to end with a common shaft 41' for driving the cams of both controllers, the cams of one instrument being angularly displaced with respect to the cams of the other instrument, for example 180° or as otherwise required. Or, if desired, the instruments if placed above each other could have their cam shafts connected by a chain and sprocket or geared to each other.

However, in the specific aspect of the invention now being considered the alternate impulses are effected by having the current supply for neutral lead 117 of the frequency controller successively momentarily broken by an interrupter I, Fig. 1, and during the interval of the breaks the load controller is connected to transmit its load correction impulses. Starting at the frequency controller 11, neutral lead 117 is connected through wire 140 and thence through contacts 64 of the interrupter I whose contacts are closed by a cam 64' and opened by their own resiliency as the cam rotates away therefrom, the cam being rigidly connected to cam shaft 41 and suitably angularly related to cams 57 and 58. The circuit continues on through wire 141 and downward along wire 71 to switch 7d in position II and thence to the main control supply lead 70. It is thus seen that frequency control impulses can only be transmitted upon closure of the contacts 64. When contacts 64 are open the supply of current for neutral lead 117 of the frequency controller is broken at which time load control impulses are then transmitted. This method provides a positive means for insuring non-interference between the frequency and load control impulses and yet permits simultaneous operation of the frequency and load controllers. It is also seen that while the frequency control impulses increase or decrease the load on each unit simultaneously, yet the load control impulses decrease the load on one unit while increasing the load on the other unit, or vice versa depending upon which unit is above and below the predetermined value at which they should operate for best combined efficiency. The frequency control impulses therefore tend to raise or lower the average load for the combined units while the load controller effects relative adjustment between the units so that the power output of each unit is maintained at or brought to this average value. The simultaneous increase or decrease on both units by the frequency control impulses is effected due to both lowering relays 121 and 122 being connected together by the parallel wires 119 and both raising relays 136 and 137 connected together by the parallel wires 135, whereas on the other hand, with the load control relays the lowering relay 77 and raising relay 78 are connected in parallel by wires 75 while raising relay 102 and lowering relay 103 are connected in parallel by wires 100.

In this arrangement without mechanical interconnection between controllers 11 and 12, the gearing or the motor speed of the frequency controller 11 preferably operates the contacting mechanism at two or three times the speed of the contacting mechanism on controller 12. This is to avoid any possibility of having all the frequency control impulses coincide with the opening of the interrupter I as might be the case where the two controllers operate at exactly the same speed. With the mechanically connected arrangement shown in Fig. 7 the cams are arranged 180° apart and the frequency control impulses cannot coincide with the opening of the interrupter.

*Type 1-B operation. Unit No. 1 on frequency control with unit No. 2 shut down.*—To shut down unit No. 2 and to place unit No. 1 on frequency control only, unit selector switch 7 is moved to position I, while the sequence selector switch 9 remains in position III. When unit selector switch 7 is moved to position I the connection is broken from supply lead 70 across switch element 7d to wire 71 which is connected across closed contacts 72 to neutral wire 73 of load controller 12. At the same time current supply for the load controller motor 42 is cut off although current supply for the frequency controller motor 42fc is maintained. This is accomplished in that for postion II on unit selector switch the motor circuit for frequency controller 11 is (upper right hand corner Fig. 1) from A. C. supply 400, through wire 151 to motor 42fc thence through wire 153, across switch 7f in position I and wire 154 to the other supply line 155. The circuit for load controller motor 42, when connected for position II of unit selector switch, is from line 150, wire 151, motor 42, wire 156, across closed contacts 157, wire 158, switch 7e (when in position II) to wire 154 and supply lead 155. Therefore, upon moving unit selector switch 7f to position I, a closed circuit is maintained with wire 154 while the circuit through switch 7e is opened thereby breaking the circuit through wire 158 for motor 42.

It is thus seen that unit No. 1 will now be subject only to frequency control impulses and under no circumstances can either unit be subject to load control impulses. This is accomplished by disconnecting relays 122 and 137 of motor 4 (which is for units No. 2) while maintaining a circuit for lowering and raising relays 121 and 136 of motor 3 (which is for unit No. 1). The disconnection of relays 122, 137 for load adjusting motor 4 is effected in that switch 7c when moved to position I breaks the circuit for wires 126 and 127 which return from these relays. The relays 121, 136 for unit No. 1 have their return circuit maintained due to return wires 123, 124 being connected across switch 7b in position I, wire 125 leading back to main supply 162. The functioning of the frequency controller and the associated circuits for load adjusting motor 3 of unit No. 1 is the same as described in connection with Type 1-A operation.

*Type 1-C operation. Unit No. 2 on frequency control with unit No. 1 shut down.*—This operation is effected by moving unit selector switch 7 to position III while retaining sequence selector switch in position III. With switch 7 in position III the circuit for load controller motor 42 is still broken by switch 7e. At the same time the return circuit for relays 121 and 136 for motor 3 of unit No. 1 is broken by switch 7b being in position III, this switch otherwise normally connecting return wires 123 and 124 with wire 125. However, return wires 126 and 127 of relays 122 and 137 are in a closed circuit due to wire 127 being connected across switch 7c in position III to a wire 127' and thence through switch 8b connected to wire 125 leading back to main lead 162. It is thus seen that unit No. 2 can receive only frequency control impulses, the load controller being entirely eliminated. The operation is otherwise the same as previously described.

*Type II operation.*—The apparatus already described is arranged to maintain constant frequency on an electric generating system, with one or two units in service, and when two units are employed to effect the economic distribution of load between them. In combination with this apparatus, additional equipment hereinafter described may be employed which will automatically maintain the proper number of units in service. Normal operation would call for two units to be in service as described above for Type I-A operation, but should the demand drop below the point where two units are required, the surplus unit is cut off, and in order to be available without delay, when required for service, should be maintained in parallel with the generating system, operating as a synchronous condenser or merely "floating" on the system with the turbine gates closed, and the draft tube vented, and being driven as a motor with power supplied from the generating system. With the apparatus as described hereinafter, there are two combinations possible, namely, Type II-A, wherein unit No. 1 is on continuous or primary service, with unit No. 2 transferring from load to condenser or vice-versa, that is, in reserve; or, Type II-B, wherein unit No. 2 is on primary service with unit No. 1 in reserve.

Type II operation may normally be considered as having both units in service, and to be the same as Type I-A operation previously described, except that different positions of sequence selector switch 9 are used, and the connections are made with suitable means for Types II-A and II-B operation to place one unit on condenser when necessary.

*Type II-A operation. Station frequency control with unit No. 1 on load and unit No. 2 on condenser.*—During this operation unit No. 1 is subject to frequency control impulses but not to load control while unit No. 2 is not subject to either frequency or load control impulses, since it floats on the system as a synchronous condenser. To accomplish this operation both the unit and sequence switches 7 and 9 are in position II.

Movement of the sequence selector switch to position II closes a circuit (lower left corner Fig. 1) from supply lead 70' through wire 161, protective relays hereinafter described, wires 162, 163 and 165 to energize relay 166, thence back through wire 167, across switch 9f in position II to wire 168, and through closed contacts 169 to wires 212 and 173, in which is disposed a normally closed hand switch 171, to the other side 70 of the supply line. Energization of relay 166 opens contacts 72 and 157 thereby breaking the circuit through wire 156 for motor 42, and also opening the neutral wire 73 for the load controller. A supply for the frequency controller neutral lead 117 is established from supply lead 70, through switch 7d in position II, wires 71 and 174, contacts 175 (closed upon energization of coil 166) to neutral lead 117, thence through, say; finger 59fc and 58fc in which case the circuit is through wire 118, parallel wires 119 leading to relay 121, back through wire 123, across contact bar of relay T₁, wire 124 and switch 7b in position II to wire 125 and then to the main supply lead 162. A similar circuit is established when the contact finger 60fc and cam 57fc are closed. A relay 176 is energized simultaneously with relay 166 due to being connected in parallel with relay 166 as by wires 177, thereby opening the galvanometer circuit through wires 25.

To prevent unit No. 2 responding to frequency or load impulses and yet permit it to float on the line, the return wire 126 of relays 122 and 137 is disconnected by opening the contacts of relay T₂ automatically when sequence selector switch is moved into position II. The control of relays T₂ and T₁ is described later.

Unit No. 2 as described above is now disconnected from both frequency and load control and can float on the line as a synchronous condenser when a motor operated load limit, to be described, is in the closed position (condenser position) thereby holding the gates closed by the action of the governor. The draft tube of the unit is vented by means of an automatic air valve all as hereinafter described.

*Type II-A operation cont'd. Automatic transfer of unit No. 2 from condenser to load or vice versa.*—In this operation it is assumed that only unit No. 1 is carrying load while unit No. 2 is on condenser. If the system load increases to such a value that the two units can more efficiently carry the load, means are provided for automatically transferring unit No. 2 from condenser to load. Or, if both units are on load and the power demand decreases so that the load may be carried more efficiently by only one unit then one unit is transferred back to condenser operation. These transferring functions are briefly referred to as automatic transfer of which there are two phases, one called a delayed transfer and the other a high speed transfer.

*Delayed transfer.*—With unit No. 1 on load and unit No. 2 on condenser if the system load gradually increases, the frequency controller through the load adjusting motor 3, will cause the turbine gates of unit No. 1 to gradually open, this being effected through operation of a gate operating servo-motor 16', Fig. 2, which includes the gate or piston rod 15 diagrammatically shown in Fig. 1. As the load increases, this rod continues to move out until upon reaching a certain fixed percentage of gate opening, determined by the economic maximum load for unit No. 1 operating alone, a cam 200 which is carried for instance by the piston rod will engage and raise the free lower end of a pivoted switch arm 201 thereby closing contacts 202. Switch 201 and others of a similar nature are supported on a frame 16b secured to the gate cylinder so as to overlap the piston rod 15 or 16. The frame has a longitudinal slot 16c through which the cam projects while other slots 16d allow for longitudinal relative adjustment between the switches thereby permitting the various transfer functions to be effected at any desired percent of gate opening. Upon closure of contacts 202 as just previously described a circuit is established from the main alternating current supply line 20, wire 155 (top of Fig. 1) through wire 203, switch 9d in position II, wire 204, across contacts 202, thence through wire 205 to energize time delay load transfer relay 207, thence through wire 208, switch 9c in position II to wire 210 connected to the other side 150 of the main supply. If the increase in load on unit No. 1 is merely a temporary fluctuation so that cam 200 closes contacts 202 and then backs away to re-open the same before expiration of the time for which the time delay relay is set, the unit will not be transferred from condenser to load. This insures against transferring a unit during an insignificant fluctuation in power demand. The length of time which is necessary for any fluctuation to be maintained before transfer will take place can be adjusted by varying the time of operation of the time delay relays. Such adjustability is a well known characteristic of this type of relay and hence need not be further described. If the power demand is maintained so that cam 200 will move over switch arm 201 sufficiently slowly thereby maintaining contacts 202 closed for the predetermined interval of time for which the time delay relay is set then relay contacts 211 will close, thereby completing a circuit (bottom of Fig. 1) from main direct current supply lead 70 through wire 173 in which is disposed a normally closed switch 171, then through wires 212, 213 across contacts 211 to unlatching coil 214, thence through wire 215, across switch 9e in position II to lead 163, wire 162 and thence to the other side 70' of the main supply. Energization of relay 214 unlatches its contact bar so as to open upper contacts 217 and close lower contacts 218 to effect the transfer function from condenser to load in the manner to be described shortly.

It is to be understood that the contact bar was initially raised when the turbine gates for unit No. 1 were previously partly closed. The raising was effected due to the fact that when the turbine gates were in partly closed position cam 200 engaged a pivoted switch arm 220 to close contacts 221, whereby a circuit was established from wire 204, across contacts 221, through wire 222 to energize time delay relay 223 and thence to wire 208 to complete the circuit. When contacts 224 of the time delay relay close, a circuit is established from wire 212, through contacts 224 to energize latching coil 226 of the relay and thereby raise its contact bar to close contacts 217. The latching and unlatching mechanism, including coils 226 and 214, is a well known form of relay control and hence further details as to the mechanical structure of such a device is not essential, except to state that when the contact bar is raised by coil 226, the core thereof is latched in its upper position by the core of coil 214. It is by energizing coil 214 that the core of coil 226 is unlatched to permit the contact bar to fall and close contacts 218. As will more clearly appear later, the latching operation effects specifically the function of automatically transferring the unit from load back to condenser.

Reverting to the function of transferring unit No. 2 from condenser to load as when cam 200 engaged switch arm 201 thereby causing closure of contacts 218, the closure of these contacts establishes a circuit from supply lead 70 through wires 173, 212, contacts 169, wire 230, across contacts 218, thence through wire 231, field 232, motor armature 234 of the motor operated load limit device, wire 235, manually adjustable resistances 236, 237 and wire 238 to lead 215, thence through switch 9e in position II to lead 163 and 162 to the other supply lead 70'. Actuation of the load limit motor 234 as by energization of field 232 causes counter clockwise rotation of a load limit cam diagrammatically indicated at 240. Load limit mechanisms are well known devices of hydraulic speed governors, one of which is more fully disclosed in my copending speed governor application Serial No. 301,374. The load limit is arranged to raise the pilot valve of the speed governor when cam 240 is rotated clockwise to the position shown, thereby closing the turbine gates and automatically opening an air vent to the draft tube of the turbines. The gate closure is effected independently of the turbine speed or governor. Under this condition the turbine merely floats on the line as a condenser although when the cam 240 is rotated in a counter clockwise direction, as is now considered to be the case due to energization of field 232, the governor pilot valve is released so as to return to the control of the centrifugal head and load adjusting motor 4 thus permitting the unit to carry its share of the load. During rotation of cam 240 in its counterclockwise direction a pin 241, carried by the cam, first engages an arm of pivot switch 242 to close the same and upon continued cam rotation the pin finally engages one of the arms of pivot switch 169 to break the circuit through wire 230, thereby stopping rotation of the load limit motor 234. During this adjustment of the load limit cam, unit No. 2 automatically takes on some of the load of unit No. 1 due to the two units operating in parallel and being synchronously connected together. Unit No. 2 is thus transferred from condenser to load automatically when the load on unit No. 1 reaches a predetermined value.

Upon transferring unit No. 2 to load it is necessary, in order to obtain maximum combined efficiency for the two units, to have the load equally divided therebetween assuming the units are of identical characteristics. Also during maintenance of this equal division of load both units contribute to maintaining frequency. To accomplish these two functions, the frequency and load control circuits for both units are entirely re-established upon energization of unlatching coil 214 with consequent opening of switch 169 because opening of this switch breaks the circuit through contacts 169 and wire 168 leading to coils of relays 166 and 176. This closes contacts 157 and thus establishes the circuit through wire 156 for the load controller motor 42 and also re-establishes the circuit through neutral lead 73 whereupon frequency and load correction impulses will be alternately transmitted to the two units in the manner as described with type 1-A operation.

*High speed transfer.*—With unit No. 1 on load and unit No. 2 on condenser, if the load on unit 1 increases at such a fast rate that cam 200 moves past transfer switch 202 (temporarily closing switch 202 but not for a sufficient period of time to permit operation of its time delay relay) the cam then causes closure of high speed transfer switch 250. That is, the power demand increases at such a fast rate that it is desirable to transfer unit No. 2 immediately from condenser to load. The arms for these two switches are preferably relatively close together so as to insure closure of one or the other of contacts 202 or 250 without possibility of the cam coming to rest between the two arms and thus not effecting actuation of either. This high speed transfer is effected, upon closure of contacts 250, by shunting around the time delay relay 207 thereby establishing a supplemental circuit for unlatching coil 214. The relay control for this circuit is from main lead 70 through wires 173, 212, 252, contacts of switch 250, wire 253, thence through parallel relays 254 and 255 to wires 238 and 215, switch 9e in position II and lead 163, 162 to the other side 70' of the direct current supply. Closure of relay 254 establishes the shunting circuit from wire 212 through wire 256 to unlatching coil 214 and thence through wire 215 to the other side of the line. Upon occurrence of the unlatching operation, the latched controlled contacts 218 close thereby causing rotation of the motor operated load limit in the manner as described for the time delay transfer, that is, to open the turbine gates and load the unit. To permit a high rate of motor rotation in order to facilitate the high speed transfer, resistance 236 is automatically cut out upon energization of relay 255.

*Transfer of unit No. 2 from load back to condenser.*—With both units on load and should the load demand drop to such an extent that the load could be more economically carried by one unit then the contacts of transfer switch 221 will be closed because this switch is so positioned over the gate operating piston rod as to close when the gates are closed to the predetermined point at which economical transfer should be made. Closure of this switch energizes latching coil 226 to transfer unit No. 2 to condenser, whereupon unit No. 1 will then automatically carry the entire load. The circuit for the latching coil has been previously described and hence it will suffice to say that the closure of contacts 224, which closure is delayed for a predetermined time interval after the closure of contacts 221, causes latching coil 226 to be energized to raise the contact bar to close contacts 217. Load limit motor 234, thereupon operates the load limit cam 240 in clockwise direction so as to close switch 169 and open switch 242. The circuit during this operation is from wires 173 and 212, through switch 242, wire 260, contacts 217, wire 261, through field 262, motor 234 and thence through wire 235, resistances 236 and 237 to the other side of the line as by wire 238. The resistances 236 and 237 effect a relatively slow rate of rotation of load limit motor 234 in comparison to the rate of rotation which is effected when resistance 236 is cut out as during the high speed transfer.

Opening of contacts 218 prevents, in the manner previously described, transmission of frequency control impulses to unit No. 2 and at the same time entirely disconnects the load controller from each unit.

*Automatic maintenance of governor pilot valve setting during transfer from load to condenser: Relays $T_1$ and $T_2$.*—The two relays $T_1$, $T_2$ (lower right hand corner of Fig. 1) are adapted to immediately disconnect their respective load adjusting motors 3 and 4 when their respective units are transferred from load to condenser. This insures that when a unit is later transferred back from condenser to load the governor pilot valve for that unit instantly has the same setting that it had prior to the transfer from load to condenser. Thus the unit will be more quickly and effectively brought to its normal operating condition than it would if the load adjusting motor had to operate through a wide range to restore the original setting of the pilot valve. If the load adjusting motors were not disconnected when their unit was transferred from load to condenser, then as the motor operated load limit 240 or 240' rotated through its full range the load adjusting motors would constantly readjust their pilot valve until the transfer was completed. To eliminate this unnecessary adjustment switches 169 and 169' are so arranged that immediately upon clockwise rotation of the motor operated load limit cam 240 these switches will be closed, thereby energizing the coils of $T_1$ or $T_2$ depending upon whether switch 169 or 169' is closed. The circuit for these relays is from D. C. supply line 70 through wire 173, wire 212, contacts 169, wire 168 to coil of relay $T_2$, through switch 9a in position 2, thence through wire 125 to the other side of the direct current supply line 70' as through the protective circuit later described. The circuit for relay $T_1$ is taken from the contacts 169' through wire 168' to coil of relay $T_1$ and thence through switch 9a in position I, the remainder of the circuit being the same as with $T_2$.

*Type II–B operation. Reverse order of operation of the units, i. e., unit No. 2 on station frequency control with unit No. 2 on synchronous condenser.*—The units here simply operate in the reverse order to that in which they have been previously described. Hence it is not necessary to give a detailed description of all the various circuits or functions which might be performed as the previously described operations apply to this reverse order as well. The reversal of units is effected by having unit selector switch 7 in position II and sequence selector switch 9 in position I. An understanding of the operations will be clear as the corresponding electrical elements of each unit will have the same reference numbers except that the reference numbers for unit No. 1 are primed. The wires leading to or from the main supply lines are as follows: The latching and unlatching coils are supplied by wires 212' and 215', wire 215' being connected through switch 9e in position I to lead 163. The transfer switches 221', 202' and 250' and time relays 223' and 207' are supplied through wires 204' and 208' connected respectively through switches 9c and 9d in position I to lines 210 and 203. The frequency control relays 121, 136 and 122, 137 are also arranged so that only unit No. 2 will be supplied with frequency control impulses when unit No. 1 is on condenser. This is effected due to the fact that relay $T_1$ is energized and opened when sequence selector switch 9a is moved to position I, thereby opening the return wires 123 and 124 of frequency relays 121 and 136. The energizing circuit for relay $T_1$ is from supply lead 162, wire 125, across switch 9a in position I to coil of relay $T_1$, thence to the left along wire 168' to switch 169' and wire 212' which is connected to the other side 173 of the supply. The connections to load control relays 77, 78, 102 and 103 are not changed because these relays are operative only when both units are on load.

*Protective circuit.*—With an alternating current generator running and upon closure of any suitable switch mechanism for the main line 20 a relay 300 will be energized by current supplied through wires 301. Energization of the relay raises its contact bar so as to light an indicating lamp 302 as by current flowing from D. C. wire 70' through wires 161 and 303 across the relay contacts to lamp 302, preferably red, and thence through wire 304 to the other side of the D. C. line 70. A push button 305 is then momentarily manually closed whereupon current flows from one side of the D. C. line through wire 161, contacts of the momentary push button 305, thence through wire 306 to energize relays 307 and 308, each of which has its other sides connected to a wire 309 leading to the other side of the D. C. line 70. Energization of relay 307 raises its contact bar to establish a holding circuit for relays 307 and 308 when push button 305 is released. This holding circuit constitutes a part of the protective circuit and is dependent upon the protective circuit being energized. This protective circuit, starting with wire 310 from the positive side 70' of the D. C. supply, consists of a single wire going through in series the following switches and instruments. The line passes through a normally closed push button 311, thence across the upper right hand contacts of relay 300, thence through a normally closed push button 312 across the normally closed contacts of a relay 313 which is opened upon occurrence of an abnormal frequency which is controlled by the frequency recorder. The protective circuit continues from this relay through wire 314 to switch 7a, thence across through line 315 with switch 7a in position II and also through line 316 with switch 7a in either position I or III. Each of the wires 315 and 316 is commonly connected as by wire 317 through switches 9g and 9h in any of their three positions. Wire 317 continues over to the upper left pair of contacts of relay 307 to establish the holding circuit for relays 307 and 308 as by wire 318 and 306. When relay 307 is energized the circuit from the protective circuit wire 317 is continued through an indicating lamp 319, preferably red, from which the current flows to wire 304 to the other side of the D. C. line. Closure of relay 307 in its up position establishes the positive side 81 of the circuit for the load adjusting motors 3 and 4 all as previously described. The protective circuit is further provided with a signal bell to indicate whether the circuit is on or off, and the arrangement is such that a single bell is used for these two purposes. With the protective circuit closed and relay 308 in its up position current flows through wire 322 across the upper left pair of relay contacts through wire 323 to a three way switch 324 connected to wire 323 and to bell 325, which in turn leads to the other side 70 of the D. C. supply. Hence bell 325 rings indicating that the protective circuit has been closed whereupon the operator then throws switch 324 to its left hand contact thereby breaking the bell circuit but establishing a supplemental circuit with a wire 326 connected to one of the lower left hand contacts of relay 308. If now the protective circuit is broken due to any one of several causes hereafter described, a circuit will be established from wire 322 through wire 326 and across switch 324 to ring bell 325. This warns the operator that the protective circuit is open and in order to stop the bell from ringing he must throw switch 324 to its right hand contact whereupon it is seen that when the protective circuit is re-established the bell will also begin to ring whereupon he will then repeat the cycle by throwing switch 324 to its left hand contact.

When the protective circuit is opened, relay 307 is in its down position thereby closing its lower right hand pair of contacts to establish a circuit for an indicating lamp 327, the circuit for which is taken from wires 303 and led back to wire 304. Likewise if the alternating current supply fails, relay 300 drops to its lower position to close its lower left hand pair of contacts thereby lighting an indicating lamp 328, the circuit for which is likewise taken from wire 303 and back to wire 304. Lamps 327 and 328 are preferably green or any other color to distinguish from the closed circuit lamps 302 and 319.

Upon opening of the protective circuit the D. C. supply to the automatic control equipment is cut off even though the alternating current supply may continue. The protective circuit opens under any of the following conditions: Frequency exceeding high or low limit settings as set on a frequency recorder generally indicated at 420 and of any well-known manufacture; change in type of operation by moving either selector switch 7 or 9; the failure of A. C. supply to the control panel; failure of D. C. supply; incorrect setting of selector switches 8 or 9; removing a unit from automatic control and manually tripping either at the control panel or at a bench board by means of a suitable trip button. Various other conditions might arise which would automatically open the protective circuit such for instance as the relays burning out and other conditions which will be apparent to those skilled in the art.

One function of the frequency recorder 420 in connection with my improved automatic control arrangement is to open the protective circuit in the event of abnormally high or low frequency. It is arranged, upon occurrence of these abnormal conditions, to energize relay 313 and open its contacts. The recorder is of a well-known manufacture and a description of its general features will suffice for purposes of this application. This recorder includes a continuously operating synchronous motor 421 connected to the A. C. lines 20. Any variation in frequency from normal closes suitable contacts 422 whereby a direct current motor 424 is operated in one direction or the other depending upon whether the frequency varies above or below normal. Rotation of motor 424 moves an endless chain diagrammatically indicated at 423 which moves a contact rod 425 so as to close one or the other of high and low limit frequency contacts 429. Upon closure of either of these contacts a circuit is established from the D. C. supply to energize relay 313 as will be described later. It will of course be understood that contacts 429 are adjusted in accordance with any desired degree of variation from normal. The frequency recorder will be described more in detail later in connection with its transfer function.

*Manual control of transfer from load to condenser or vice versa for individual units.*—If one unit is operating on condenser it may be manually transferred to load or vice versa, as by a suitable control circuit. The description of one of these circuits will suffice for both units. To bring the unit from condenser to load a normally open push-pull switch 450 is pulled in a downward direction on the drawing, whereupon a circuit is established from line 70' of the D. C. supply through wire 451, across the lower left hand pair of contacts of switch 450 to wire 452, thence through unlatching coil 214 to wire 453 to the lower right hand pair of contacts of switch 450 and thence through wires 212 and 173 to the other side 70 of the D. C. supply. Energization of unlatching coil 214 causes unit No. 2 to be transferred from condenser to load in the manner as previously described with the automatic operation.

To transfer from load back to condenser the push-pull switch 450 will be moved to its up position whereupon current from wire 451 then passes across the upper left hand pair of contacts of switch 450 and through wire 452, latching coil 226, wire 454, across the upper right hand pair of contacts of switch 450 to wire 212 and the other side of the D. C. supply as described.

It is seen from the description of this circuit and the fact that there is a similar circuit and control switch for the other unit that these two units can be either independently or simultaneously transferred from load to condenser or vice versa without any interference from the automatic control. It is also seen that even with the automatic control in operation the units can be manually transferred if for any reason such should be desired without throwing the automatic control out of operation. If the manual control is superimposed upon the automatic control it will be seen that if the load demand changes so that the units should be transferred in accordance with the automatic control, the gate operating rod would automatically operate the switches 202 or 250 and thus cause the units to take care of any sudden load demand. If it is desired to have a certain manually effected operation which happens to be momentarily opposed by the automatic control the manual control switches 450 and 450' are held in one or the other of their closed positions until the controlling tendency of the automatic equipment subsides. However, normally these manual switches are only momentarily closed as the latching and unlatching coils 226 and 214 will respond instantly to a momentary closure of the manual control switches.

*Actuating mechanism for variable rotatable resistances: Automatic venting of draft tube.*—Fig. 8 illustrates one form of mechanism which is used in practice for actuating the rotatable resistances 13 and 14 in place of the arrangement shown in the wiring diagram. This Fig. 8 form includes a box $y_1$ containing a rotatable circular resistance such as 13 or 14 driven through a pinion $y_2$ by a suitably supported reciprocable rack $y_3$. This rack is pivotally connected to a link $y_4$ while a second link $y_5$ is pivotally connected at any fixed position, through an adjustable slotted connection, to an oscillatable arm $y_6$. The two links $y_4$ and $y_5$ are interconnected by a common compression spring $y_8$, Fig. 9, disposed within a container $y_7$. Such a container is shown more particularly in Fig. 9 wherein it will be noted that the zero position of the resistance which is actuated by pinion $y_2$ may be adjusted by adjusting the threaded link $y_4$. The slotted connection between link $y_5$ and arm $y_6$ permits adjustment of the range of movement of rack $y_3$ and the resistance, the degree of movement thereof being dependent upon the distance between the link $y_5$ and the shaft $y_{10}$ to which arm $y_6$ is connected. Shaft $y_{10}$ is preferably any oscillatable shaft of the usual governor restoring mechanism one suitable element of which may be a bell crank for connecting the servo-motor or turbine gates with the governor proper. The double acting compression spring permits yielding in case of improper adjustments.

When a unit is transferred from load to condenser it is desired automatically to vent the draft tube, if the prime mover is a hydraulic turbine, thereby unwatering the draft tube and permitting the turbine rotor to revolve in air with minimum friction losses. Upon transferring the unit back to load it is then necessary to close the vent preferably automatically. Various means may be employed to accomplish these results although for purposes of illustration a mechanically operated valve mechanism suitable for incorporation in my combination is shown for example in Moody Patent No. 1,606,887 and is diagrammatically indicated at V, Fig. 4, the valve mechanism being adjusted, of course, to open and close respectively when the condenser and load transfer points are reached. Instead of having the air vent mechanically actuated by the gate mechanism, the gate mechanism may be used to operate sets of auxiliary contacts Vo and Vc, Fig. 1. These sets of contacts are closed by bars connected to the condenser transfer switch 220 and load transfer switch 201. The air vent valve in this arrangement is considered to be operated in any usual manner by an electric motor provided with any usual type of limit control so that when contacts Vo are momentarily closed the motor is started and continues in operation until the valve is closed when its limit control automatically stops the motor and sets its contacts so as to be ready for opposite rotation. The draft tube for unit 2 is then vented. When the load on unit 1 increases to such a point that unit 2 should be transferred to load then momentary closure of contacts Vc by cam 200 causes the motor to operate to close the vent, the motor continuing to operate until the valve is closed when its limit control stops motor operation and sets its contacts so as to be ready for opposite rotation. It is thus seen that the air vent is opened and closed in accordance with the different transfer points for load and condenser. It will of course be understood that instead of having the air vent motor operated upon momentary closure of contacts Vo and Vc, or the corresponding contacts Vo' and Vc' on the other unit, these may operate through their respective time delay relays, one of which is illustrated at 202r Fig. 15, to avoid unnecessary opening or closure of the vent during a brief temporary fluctuation in power demand. In this case air vent contacts 250v Fig. 15, are provided for the high speed transfer 250. To simplify this arrangement, the air vent motors could be controlled by a circuit 207v Fig. 16, through the relays 207 and 223 and auxiliary contacts such as 250v Fig. 15, provided only for high speed transfer switch.

*Three or more units automatically successively transferred from load to condenser or vice versa.*—In the Fig. 10 modification three units are diagrammatically shown, namely units 2—4, the first unit not being shown as it is assumed to be on load at all times. However, the gate rod of unit 1 is diagrammatically indicated at 15 as the present modification is simply an amplification of the preferred form. As previously described with the preferred form, when the load on unit 1 reaches a predetermined value at which it is more economical to have two units carry the load rather than one, then cam 200 of unit 1 gate will close a switch 202. This switch is located so as to be actuated at that gate opening or load of the first unit at which it is desired to bring on a second unit. Assuming that cam 200 has closed switch 202, a circuit is established from one phase 300 of an alternating current source through an automatic selector switch 301 in position I, across contacts 202 to time delay relay 207 of the second unit and thence to another phase 302 of the A. C. source. Upon expiration of the time interval for which the time delay relay is set it will close to operate the motor operated load limit cam 240 thereby to open the gates of unit 2 and place the same on load. The various control operations are then the same as in the preferred form.

If, with unit 1 on load and the other units on condenser, the load demand should increase at such a rate that cam 200 would pass by contacts 202, then a high speed transfer switch 250 would be closed thereby directly energizing the motor 234 of the motor operated load limit mechanism for unit 2. Cam 200 in passing by contacts 202 would momentarily close the same but it is assumed that the rate of increase in load demand is sufficiently fast that the momentary closure would not be of sufficient duration to permit time delay relay to operate. The circuit for the high speed operation extends from one side of the D. C supply 303 through an additional section 304 of the automatic selector switch, thence across contacts 250 to motor 234 and the other side of the D. C. supply. This will cause immediate transfer of unit No. 2 from condenser to load without the operation of any time delay. The switches 202 and 250 are arranged sufficiently close to each other that cam 200 must close one or the other of these switches.

With unit 2 now transferred to load, suitable means are provided whereby unit 3 is adapted to be transferred to load in case the system demand should be greater than what could be economically carried by units 1 and 2 together. One specific form of mechanism which may be employed for adapting the third unit for transfer includes, Fig. 11, a motor 305 which directly actuates the arms of the selector switches 301, 304 and also an arm 306. All of these arms are connected, for instance, to a common shaft which can be the motor shaft or to any common countershaft in case it is desired to gear the motor down. It will be noted that arm 306, associated with what is here termed a motor control switch generally indicated at 307, is in position I when the selector arms are in position I and also that the load limit cam 240 is supplemented by a finger 308 rotatable therewith so that when cam 240 of unit 2 is operated to open the gates of this unit it will also upon initial movement open a snap switch 309 and upon termination of the cam movement the cam will close a snap switch 310. Upon closure of contacts 310, motor 305 is rotated in a clockwise direction due to a circuit from one side of the D. C. supply 303 through contacts 310 to a segment 311 and thence through an outer arm portion 312 which has slidable contact with segment 311 and thence to motor 305 and to the other side of the D. C. supply. The arm portion 312 is insulated from the inner portion of said arm to permit other circuits. Motor 305 now operates to cause clockwise rotation of arm 306 and also the arms of selector switches 301 and 304 until arm 306 has passed on to a second contact 313, thereby breaking the circuit for motor 305 and making a suitable connection to permit unit 3 to be transferred to load when cam 200' of the unit 2 gate rod engages a switch 202'. Switch 202' is located so as to close when a predetermined gate opening or load is on unit 2 at which load it is more economical to add a third unit to carry the station load rather than carry any further load by two units. Upon closure of contacts 202' a circuit is established from the A. C. source 300 of the selector switch 301 and thence through position 2 in which the arm stops when arm 306 is in its position 2 as previously described. The circuit thus continues through contacts 202' to the time delay relay 207' of unit 3 and upon expiration of the time for which this relay is set it will close to cause operation of the motor operated load limit mechanism of unit 3 to open the gates thereof and transfer the same to load.

If the system demand increases sufficiently fast so that it is desirable to transfer unit 3 quickly to load, the gate rod of unit 2 will move past contacts 202' to close contacts 250'. Upon closure of these contacts D. C. current is supplied directly to the motor operated load limit motor of unit 3 as by a circuit from the D. C. supply line 303 through the automatic sequence selector switch 304 in position 2, across contacts 250' and thence to the motor 234' to immediately open the gates of unit 3. Again as shown in Fig. 11, upon operation of the motor operated load limit of unit 3 the auxiliary finger 308' will open a snap contact 315 and close a similar snap contact 316. Closure of contact 316 establishes a circuit from the D. C. supply 303 through said contacts to segment 313 upon which the outer insulated end 312 of arm 306 engages and the circuit is continued to motor 305. Upon actuation of this motor the automatic selector switches 301, 304 and the arm 306 are again partially rotated in clockwise direction until a position 3 is reached when the motor stops due to arm 306 sliding off of segment 313.

With the first three units on load and should the system demand increase to the point where it would be more economical to bring on the fourth unit, the same sequence of operations will be brought about through operation of the gate rod of unit 3, the cams and switches thereof and the relays of unit 4. Also the switch 307 and selector switches 301, 304 will be moved to their fourth position. The cam and switches for the fourth unit are indicated in Fig. 10 by the same numbers as for units 2 and 3 except they are double primed. The delay and fast transfers are the same as before described. It is also seen from the foregoing disclosure that the automatic control of a number of units could be added indefinitely merely by multiplying the existing connections.

*Load to condenser.*—If the system load demand should decrease instead of increase so that it is more economical to carry the load by a fewer number of units, then assuming only three units on load and the fourth on condenser, unit 2 gate will move in a closing direction during this decrease in demand and finally reach a point so as to close condenser contacts 221', it being assumed that unit 4 is already on or transferred to condenser. Upon closure of these contacts a circuit will be established from A. C. supply 300 through selector switch 301 in position 3, across contacts 221 to energize time delay relay 223'. Upon closure of this relay the motor operated load limit for unit 3 will be actuated in a closing direction so as to transfer the unit from load to condenser. Also auxiliary finger 308', Fig. 11, will open snap contacts 316 and close contacts 315 thereby to establish a circuit from D. C. supply 303 through contacts 315 to an inner segment 318 and thence through the inner end of arm 306 which has sliding contact with segment 318 to the other field of motor 305. This motor then rotates in a counter-clockwise direction so as to move arm 306 to its position 2 and likewise move the arms of selector switches 301 and 304 to their position 2. When arm 306 moves off of segment 318 a circuit for motor 305 is broken and accordingly the arm comes to rest in its position 2, thereby rendering the equipment ready to transfer unit 2 from load to condenser in case the system demand should decrease still further and to such a point that it would be more economical to carry the load with only one unit rather than two.

Assuming that the system demand does further decrease, cam 200 will move in a closing direction with the gate rod of unit 1 so as to close condenser contacts 221 whereupon a circuit is established through the A. C. selector switch 301 and contacts 221 to the time delay relay 223. The operation of the motor 305 and switches 307, 301 and 304 is then repeated so as to return the same to their position 1. Unit 1 will then continue on load without at any time being transferred to condenser.

*Automatic shutdown of a unit if it constitutes a second reserve unit and automatic starting up of a second reserve unit when the first reserve unit is transferred to load.*—In the arrangement where three or more units are employed the load demand may be such that only one unit need be used to carry the load. During this time it is not desired to have more than one of the other units operating as a condenser to serve as reserve capacity so that means are provided whereby all other units will be shut down. However, when the load demand increases to such a point that it is more economical to carry the load with an additional unit, then the reserve unit is transferred to load and one of the remaining units will be started up and allowed to operate as a synchronous condenser to serve as a reserve unit, this process being continued until all units are transferred to load. Conversely if the system load decreases to the point where it would be more economical to transfer one of the units from load to condenser thereby making two units on condenser, one of these units is shut down automatically, this process being repeated as the load continuously decreases except that one unit is always on load and another on condenser. It is thus seen that this means, in its specific aspect, is adapted automatically to maintain only a given limited amount of reserve capacity no matter how many or few units are on load.

One specific arrangement for accomplishing this comprises as shown in Fig. 10 a switch section 320 having a switch arm 321 connected to the common shaft which operates switch arms 301 and 304. Inasmuch as unit 1 is always on load and unit 2 is always either on load or condenser the first contact for switch section 320 is blank. Assuming unit 2 to be on condenser the remaining units are shut down but when unit 2 is transferred to load, switch arm 321 will move to the second contact along with arms 301 and 304 as previously described. The second contact of section 320 is connected as by wire 322 to special well known equipment to start up unit 3 and bring the same on to condenser operation. The special equipment, including various relay controls, oil switches and synchronizing mechanism for starting the unit up and synchronizing the same, is not shown and need not be described herein as such equipment is well known in the art. Such art is shown, for instance, in Canadian Patent No. 314,528 or British Patent No. 265,219, of 1927. This equipment is of such a type that the operator may simply start a unit by closing a remote control switch which thereupon brings about the necessary sequence of operations. The second contact for wire 322 diagrammatically represents such a switch. With unit 3 now on condenser and should the station load increase to such a point that unit 3 is transferred to load, then when the unit is transferred switch arms 301, 304 and 321 will be rotated to the third contact whereupon unit 4 is started up and synchronized by a circuit including wire 323. When unit 4 is transferred to load the arms 301, 304 and 321 will be moved to the fourth contact but inasmuch as the equipment is specifically described herein, for purposes of illustration, with only four units the fourth contact for section 320 is blank as there is no fifth unit to be brought into reserve. As the station load decreases to such a point that unit 4 is transferred from load to condenser, arm 321 will be moved to the third contact but the equipment is so arranged that unit 4 will not be shut down until the arm 321 moves away from this third contact. Hence upon further reduction in power demand so that unit 3 is transferred to condenser, arm 321 then moves to the second contact so that upon leaving the third contact unit 4 will be automatically shut down and disconnected from the system line. Upon still further reduction in power demand unit 2 will be transferred to condenser and in so doing switch arm 321 will move to the first contact and upon leaving the second contact unit 3 is shut down and disconnected from the line. A suitable relay, such as 322', 323' Fig. 10, may be used in connection with each of the wires 322 and 323 to permit starting up of the respective units when the contacts are closed on clockwise movement of switch arm 321 and to permit shutting down of the units as the contacts are broken during counter-clockwise movement of the switch arm. When contact for wire 322 is closed, relay 322' is energized to close its contacts which connect to the starting control above referred to. The stem 322a of this relay is hollow and is free to slide axially of a stem 323a of relay 323'. When switch arm 321 moves clockwise to close the next contact for wire 323 (unit No. 4), relay 323' is energized to raise its stem and close its starting control contacts for unit No. 4 and also hold relay stem 322' in closed position even though the energizing current therefor is disconnected due to switch arm 321 having moved off of the contact for wire 322. Relay 322' is held closed upon energization of relay 323' due to a small collar 323b carried on the lower end of stem 323a engaging the lower end of hollow relay stem 322a. When switch arm 321 moves counter-clockwise so as to open the contact for wire 323 and close the contact for wire 322, it is seen that relay 323' will become deenergized and drop to open position whereas relay 322' will be energized and held in its closed position. This general arrangement and sequence of operations may be extended for any number of units as is obvious by making successive relay stems hollow as indicated.

It is thus seen that I have provided an arrangement whereby only a limited capacity, specifically one unit, will be held in reserve but with the other units adapted to be brought into reserve when the first reserve unit is transferred to load, thereby obtaining a high degree of efficiency and operation without sacrifice of reserve capacity. Of course, if desired, the automatic shutdown equipment can be disconnected thereby allowing all extra units to be on condenser or subject to being started up only manually.

In applying my invention to the modified form of Fig. 10 it is desirable in order to effect proper load distribution between units to provide each unit with its own individual load controller such as 12 in the preferred form. The galvanometer circuits for each of these load controllers is balanced against a unit load transmitter resistance of each unit, one side of each galvanometer circuit being commonly connected and also connected to the slide contact of the resistance of a so-called pilot unit. The galvanometer circuit for the load controller of this pilot unit is shunted out so that frequency control impulses may be transmitted to this particular unit, the load controllers of the other units causing the redistribution of load. Thus upon variation in frequency from normal the frequency impulses will cause the pilot unit to have its output raised or lowered and the other units will be adjusted accordingly.

*Curves illustrating basis of economic transfer.*— As shown in Fig. 12 a line 325 represents two units both on load which is equally divided, this curve being plotted for a hydraulic turbine so that the abscissa represents quantity of water inflow or power input while the ordinate represents kilowatt output. A curve 326 represents the combined effect of one unit on load and the other on condenser, that is, the condenser unit requires a certain amount of power and hence the net output of the two units is somewhat less than what the net output would be if just one unit was operating alone for the same input. A curve for one unit alone for the same input is shown at 327. However, it is assumed that the operation is along curve 326 and it is seen that as the system demand increases, the curve finally crosses curve 325. The point of crossing is a predetermined point at which it is more economical to add another unit than to carry the load on a fewer number of units. Hence the automatic control is arranged to transfer the condenser unit to load when the curves cross at the point 328.

Theoretically, upon a decreasing system demand, the second unit should be transferred from load to condenser at the crossing point 328 but under practical operation the condenser contacts 221, etc. are placed slightly below this crossing point. This is for the purpose of insuring that the change in system demand is permanent rather than merely a temporary fluctuation. If it is a temporary fluctuation it is not desirable to try to take care of the same by transferring the unit because most likely the unit would no sooner be transferred than the fluctuation would subside when the unit would then be transferred back to load. However by having the load transfer and the condenser transfer points slightly spaced apart on this curve the detrimental effects of small fluctuations will be eliminated.

To determine the gate opening of unit 1, at which unit 2 would be transferred, it is only necessary to plot the second curve 327. This curve is for one unit operating alone and shows what additional power the one unit must generate in order to carry the other unit as a condenser. For instance, at the crossing point 328 a net output of approximately 22,600 kw. is required. Now the condenser load amounts to about 600 kw. so that the total output of unit No. 1 must be approximately 23,200 kw. By plotting another curve 329 which is kw. against gate opening and finding the ordinate on this curve corresponding to 22,300 there is then determined the gate position for the crossing point 328. As the station output increases with one unit on condenser and the other on load the kilowatt output at any instant for a given input is determined by curve 326. It can be seen that if the load is carried on one unit beyond the junction of curves 326 and 325 for any given output with one unit on the line, the corresponding input will be greater than if the load were carried by two units. Also if the load were carried on two units below the junction of the curves for any given input, the output of one unit on load would be greater than that of two units on load. Therefore for best efficiency the point of transfer should be at the junction of the two curves 328.

With one unit on load and the other on condenser and with the system load increasing the condenser unit is transferred to load at the junction 328. Just prior to this point being reached one unit is carrying the entire load which we will assume is approximately 23,000 kw. and just beyond this point after the transfer operation has taken place each unit will only carry approximately one-half of this load or say 11,500 kw. Hence during a decrease in load from some value above the point 328 it is seen that the transfer from load to condenser must take place when the unit output is approximately 11,500 kw. Upon finding this value with the proper correction for the small condenser load the gate position at which a unit should be transferred from condenser to load can be determined from curve 329.

The curves are shown in connection with two units although it is clear that if three units are employed curve 325 will be dropped down an amount equal to the load required to carry an additional unit as a condenser which new curve will then represent two units on load and one on condenser, this curve being extended on up. A curve similar to 326 will be provided but also dropped down an amount equal to the load required to carry the third unit as condenser. This curve will then represent one unit on load and two on condenser. A third curve will then be drawn to represent three units on load and the point at which the new curve, corresponding to 325, intersects the curve representing three units on load will determine the point of transfer from condenser to load. If four units are employed then each curve will be dropped down an amount equal to that which is required to carry an additional unit as a condenser and a further new curve added showing four units on load.

*Gradual redistribution of load upon transfer of a unit from load to condenser; synchronizing motor employed instead of load limit motor.*—In the operation as described for Types I-III when a unit was transferred to condenser the pilot valve of the speed governor was actuated by the load limit motor operated cam, thereby effecting a relatively rapid transfer of the unit to condenser although due to resistances 236 and 236' the rate of transfer to condenser is less than that for transfer to load. Under certain conditions of operation and with units having certain characteristics such a rapid transfer may be desirable but in other instances the load and unit characteristics may be such that a more gradual transfer to condenser would be desired.

To accomplish the gradual transfer I have provided as shown in the wiring diagram of Fig. 13 an arrangement whereby the synchronizing or load adjusting motors 3 and 4 are employed to decrease the output of their respective unit when it is being transferred to condenser, it being understood that this synchronizing motor and mechanism as shown in Fig. 3 is adapted to effect a gradual movement of the governor pilot valve mechanism 9. The diagrams of Figs. 1 and 13 are with certain exceptions substantially the same. The corresponding wires and elements of the two diagrams will therefore have the same reference numbers and the two arrangements function identically with exceptions to be noted.

Assuming that both units are on load, if the load demand drops to the point where cam 200 engages condenser switch 220, time delay relay 223 will thereby be energized and upon its closure will energize latching coil 226 to raise its contact bar. Upon closure of the upper left pair of latching contacts a circuit is established from wire 212, to upper left contact of a latching relay, thence to wire 400, and through relay coils 166 and 176 to the other side of the D. C. supply as by wires 165 and 163. This energizes and raises the relays 166 and 176 so as to disconnect the galvanometer 24 of the load controller 12 and to also disconnect the circuit for motor 42 although it is to be considered in this modification that the camshaft 36 is mechanically connected to the camshaft of the frequency controller 11 in accordance with the modification shown in Fig. 7. The load controller camshaft is therefore continuously rotated.

Load control impulses, which might here be termed as load transfer impulses because they gradually decrease the load on unit 2 and increase the load on unit 1, are transmitted through the interrupter contacts 66. The circuit for these transfer impulses is from wire 212, across the closed contacts of snap switch 242, wire 260, across closed upper right pair of contacts 217, wire 401, across the upper right pair of contacts of relay 166, wires 402, across contact 66 when the same are intermittently closed, wire 403, across selector switch 9f in position 3, wire 168 to the right or raising coil 102 of unit 1 and to the left or lowering coil 103 of unit 2. These two coils are connected in parallel as by wires 100 and are connected to the other side of the D. C. supply as by wires 79 and 80. If unit 1 is operating as the reserve unit instead of unit 2 then selector switch 9f is in position 2, and lowering relay 77 is energized on unit 1 and raising relay 78 on unit 2.

However, assuming that unit 2 is the reserve unit and control impulses are being intermittently transmitted through the interrupter contact 66 it is seen that the load adjusting motors 3 and 4 will cause the output on units 1 and 2 to be gradually increased and decreased respectively or in other words the load from unit 2 is gradually caused to be taken up by unit 1. Finally when the load on unit 2 has been dropped to say approximately 5% gate opening, this unit is then transferred to condenser operation through the action of the load limit cam 240. Operation of the cam or load limit motor is effected by the provision of a gate operated switch 404 which in practice is a switch similar in construction to the switches 201, etc., but located at approximately 5% gate opening. When this switch closes a circuit is established from D. C. supply wire 212, across the closed contacts of snap switch 242, wire 260, across the upper right pair of closed contacts of the latching coil to wire 401 from which the circuit continues through a wire 406, across switch 404 and thence to field 262, wires 235, resistance 236 and wire 238 to the other side of the D. C. supply. Energization of field 262 causes clockwise rotation of cam 240 whose initial actuation closes snap switch 169 and finally opens snap switch 242. Upon opening of switch 242 the motor circuit is broken. However the cam has in the meantime lifted the governor pilot valve to its uppermost position thereby causing the turbine gates to be moved to full closed position. The unit then simply operates as a condenser. When snap switch 169 was closed it established a circuit through wire 407 to energize relay T₂ and upon energization of this relay load control impulses cannot under any circumstances be transmitted to unit No. 2.

It is to be noted that when the transferring operation was initiated no load control impulses could be transmitted from the load controller 12 due to the galvanometer circuit being broken by relay 176 and therefore there could be no action of the load controller tending to equalize the load between the units.

When unit 1 is the reverse unit the transfer functions are the same as those just described for unit 2 on reserve. In either case, however, it will be noted that during reverse transfer i. e. from condenser to load, a relatively quick transfer is more desirable and this is taken care of by having the load limit motor immediately actuated when the latching relay is unlatched by its unlatching coil 214. There is thus presented an arrangement whereby the units are gradually transferred from load to condenser and relatively quickly transferred from condenser to load.

*Frequency control of transfer from condenser to load.*—If for any reason the frequency varies from normal by a given amount the frequency recorder generally indicated at 420 functions to close the high speed transfer circuit whereby a reserve unit is transferred to load to help correct the frequency. The frequency recorder shown may be of any usual type which, in order to render it adapted for the particular use herein, is provided with suitable contacts such as will be described. The controller, however, specifically shown has a centrifugal flyball head driven by a synchronous motor, Fig. 1, all of which is generally indicated at 421 and is connected to the main lines by wires 422. This instrument will be only briefly described as its construction and operation are well known. Upon fluctuations in frequency the flyball governor raises or lowers a pivoted bar 423 about a pivot at its left end, thereby causing closure of one or the other contacts for the fields of a motor generally indicated at 424. This motor is connected through a suitable gear train and endless chain to cause bodily sidewise movement of an indicating bar 425, which is connected to the chain. This bar is supported at its upper end on rollers which travel along the pivoted lever 423 while its lower end carries a contact adapted to engage a low frequency stationary contact 426. As the indicating bar is moved toward or away from a centrifugal head 421 depending upon whether the variation in frequency is above or below normal, the weight of the indicating bar will either act against the action of the flyball governors or permit greater action thereof, thereby closing one or the other of the field contacts. However, assuming that the frequency is below normal and contact 426 is closed, a circuit is established from one side of the D. C. supply through wire 427, across closed contact 426 to wire 428 and thence to one side of the high speed transfer switch 250 to energize relay 254 and accordingly energize unlatching coil 214 and thus transfer the unit from condenser to load.

When the frequency is sufficiently corrected, contact 426 will be opened thereby permitting the unit to be transferred back to condenser if the station output is sufficiently low as to not necessitate maintaining the unit on load. The transfer of this unit back to condenser is effected, as previously described, by closure of the condenser transfer switch 220.

If the frequency should fluctuate to an abnormally high or low value further contacts 429 are provided at high and low frequency values. These two contacts are connected to a common wire 335 and this in turn controls protective circuit relay 313. Upon energization of this relay it opens the protective circuit as previously described, thereby disconnecting the automatic control equipment but allowing the units to remain subject to manual control.

It is of course clear that various changes may be made in the several modifications described without departing from the spirit of the invention as set forth in the appended claims, and it is to be further understood that condenser operation as referred to herein merely broadly requires a part gate position such that the unit generators act as a motor although for best efficiency and general operation it is desirable that the gates should be completely shut as specifically described. In the broader aspects of the invention a unit serving as reserve capacity can be operating either at no load or as a condenser.

I claim:

1. A control system for a plurality of prime mover operated alternating current generating units connected in parallel comprising, in combination, means for operating a unit on load and another on condenser, and means for transferring the condenser unit to load automatically at points of load for effecting economic load distribution between the units.

2. A control system for a plurality of prime mover operated alternating current generating units connected in parallel, means for operating certain of said units on load and certain of the units on condenser, and means for transferring a condenser unit to load automatically when the load demand increases to the point where the load demand can be more economically carried with the condenser unit on load.

3. A control system for a plurality of prime mover operated alternating current generating units connected in parallel comprising, in combination, means for operating a unit on load and another on condenser, means for transferring the condenser unit to load automatically upon occurrence of a given power demand, and means for distributing the load between said units automatically in accordance with a predetermined schedule of operation.

4. A control system for a plurality of prime mover operated alternating current generating units connected in parallel comprising, in combination, means for operating certain of said units on load, and means for causing an additional unit to be placed on load automatically in accordance with a predetermined schedule of maximum efficiency of operation as based on the combined effect of the efficiency curves for the individual units which are to be placed on load.

5. A control system for a plurality of prime mover operated alternating current generating units connected in parallel comprising, in combination, means for operating certain of said units on load, means for causing an additional unit to be placed on load automatically in accordance with a predetermined schedule of maximum efficiency of operation as based on the combined effect of the efficiency curves for the individual units which are to be placed on load, and means whereby upon addition of a unit the load is distributed between all units automatically in accordance with a schedule of operation which effects substantially maximum efficiency for the combined operation of the units.

6. A control system for a plurality of prime mover operated alternating current generating units connected in parallel comprising, in combination, means for operating a plurality of units on load, and means for transferring a unit from load to condenser automatically at points of load for effecting economic load distribution between the units.

7. A control system for a plurality of prime mover operated alternating current generating units connected in parallel comprising, in combination, means for operating a plurality of units on load, and means for transferring one of said units to floating reserve in parallel with any unit on load automatically at points of load for effecting economic load distribution between the units.

8. A control system for a plurality of prime mover operated alternating current generating units connected in parallel comprising, in combination, means for operating a unit on load and another on condenser, and means for transferring the condenser unit to load or back to condenser automatically at points of load for effecting economic load distribution between the units.

9. A control system for a plurality of prime mover operated alternating current generating units connected in parallel comprising, in combination, means whereby a unit operates on load and another on condenser, and time delay means for transferring the condenser unit to load automatically in accordance with a predetermined schedule of operation.

10. A control system for a plurality of prime mover operated alternating current generating units connected in parallel comprising, in combination, means for operating a unit on load and another in reserve, time delay means for transferring the reserve unit to load, and means for also transferring the reserve unit to load without time delay automatically upon occurrence of predetermined operating conditions.

11. A control system for a plurality of prime mover operated alternating current generating units connected in parallel comprising, in combination, means for operating one unit on load and another on reserve, time delay means for transferring the reserve unit to load automatically in accordance with a schedule of operation, and means for transferring the last mentioned unit back to reserve automatically in accordance with said schedule of operation.

12. A control system for a plurality of prime mover operated alternating current generating units connected in parallel comprising, in combination, means for operating a unit on load and another in reserve, time delay means for transferring the reserve unit to load automatically in accordance with a schedule of operation, means for effecting substantially immediate transfer of the reserve unit to load automatically upon occurrence of certain operating conditions, and means for transferring the last mentioned unit back to reserve automatically in accordance with the operating schedule.

13. A control system for a plurality of prime mover operated alternating current generating units connected in parallel comprising, in combination, means for operating a unit on load and another in reserve, means for transferring the reserve unit to load automatically when the output of the unit already on load increases to a predetermined value at which more economic load distribution between the units is obtained by adding a further unit, and means for transferring the reserve unit back to reserve automatically when the average unit output is materially less than the unit output at which the reserve unit was transferred to load.

14. A control system for a plurality of prime mover operated alternating current generating units connected in parallel comprising, in combination, means for operating certain of the units on load and certain of the units in reserve, means for transferring a reserve unit from reserve to load or vice versa automatically in accordance with a schedule of operation, and means whereby the rate at which the load on a unit is adjusted, in order to effect transfer, is different for the transfer operation to reserve than to load.

15. A control system for a plurality of prime mover operated alternating current generating units connected in parallel comprising, in combination, means for operating a unit on load and another in reserve, means for transferring the reserve unit to load or back to reserve automatically in accordance with a schedule of operation, and means whereby the rate at which the load is increased on the reserve unit during its transfer to load is relatively rapid in comparison to a relatively gradual rate of decreasing the load during transfer to reserve.

16. A control system for a plurality of prime mover operated alternating current generating units connected in parallel comprising, in combination, means for operating a unit on load and another in reserve, means for transferring the reserve unit to load or back to reserve automatically in accordance with a schedule of operation, means whereby the rate at which the load is increased on the reserve unit during its transfer to load is relatively rapid in comparison to a relatively gradual rate of decreasing the load during transfer to reserve, and means for distributing the total load demand between the units automatically in accordance with a schedule of economic operation.

17. A control system for a plurality of prime mover operated alternating current generating units connected in parallel comprising, in combination, means for operating a unit on load and another in reserve, means for transferring the reserve unit to load, means for distributing the load between the units automatically in accordance with a schedule of economic load distribution between the units, and means for transferring the reserve unit from load back to reserve, automatically in accordance with said schedule of economic load distribution, by decreasing the load on the reserve unit at a certain rate and increasing the load on the other unit at substantially the same rate.

18. A control system for a plurality of prime mover operated alternating current generating units connected in parallel comprising, in combination, means whereby units operate on load and in reserve, means for transferring a reserve unit to load automatically in accordance with a schedule of operation, means for controlling frequency by transmitting frequency control impulses to at least one unit on load, and means for maintaining a predetermined distribution of load between the units by transmitting lowering control impulses to one unit and raising control impulses to another unit.

19. A control system for a plurality of prime mover operated alternating current generating units connected in parallel comprising, in combination, means for maintaining at least one of said units always on load and another always in floating reserve in parallel with any unit on load, and means automatically operable in accordance with a predetermined schedule of economic load distribution between the units for progressively transferring all of the units to load until all of the available units are on load.

20. A control system for three or more prime mover operated alternating current generating units connected in parallel comprising, in combination, means for operating all of the three or more units on load, and means for progressively transferring the units to floating reserve in parallel with any unit on load automatically in accordance with a predetermined schedule of economic load distribution between the units and in response to a decrease in load demand, but causing one of said units to remain on load irrespective of the extent of reduced load demand.

21. A control system for three or more prime mover operated alternating current generating units connected in parallel comprising, in combination, means for operating a variable number of units on load, and means whereby as the number of units on load is varied a substantially constant amount of reserve capacity is automatically maintained.

22. A control system for three or more prime mover operated alternating current generating units connected in parallel comprising, in combination, means for operating certain of the units on load with certain of the other units in reserve and the remainder shut down, means for transferring the reserve unit to load automatically in accordance with predetermined operating conditions, and means whereby upon transfer of the reserve unit to load one of the units which is shut down is started up and brought into reserve.

23. A control system for three or more prime mover operated alternating current generating units connected in parallel comprising, in combination, means whereby with three or more units on load one of the units is adapted to be transferred to reserve automatically in accordance with a decrease in load demand, and means whereby when the load demand further decreases to a predetermined point another unit is transferred automatically to reserve and the first reserve unit is shut down.

24. A control system for three or more prime mover operated alternating current generating units connected in parallel comprising, in combination, means for operating certain of the units on load with certain of the other units in reserve and the remainder shut down, means whereby the reserve and shut down units are respectively progressively transferred from reserve to load and from shut down to reserve automatically in accordance with predetermined increases in load demand, and means whereby upon predetermined decreases in load demand the reserve units are progressively shut down and the units on load are progressively transferred from load to reserve.

25. A control system for a plurality of prime mover operated alternating current generating units connected in parallel comprising, in combination, means for operating a unit on load and another in floating reserve in parallel with any unit on load, means for transferring the reserve unit to load automatically in accordance with a predetermined schedule of economic load distribution between the units, and means for also manually transferring the reserve unit to load independently of the automatic control.

26. A control system for a plurality of prime mover operated alternating current generating units connected in parallel comprising, in combination, means for operating a unit on load and another in floating reserve in parallel with any unit on load, means for automatically transferring the reserve unit to load or back to reserve automatically in accordance with a predetermined schedule of economic load distribution between units, and means for manually transferring the reserve unit from load to reserve or vice versa independently of the automatic control.

27. A control system for a plurality of prime mover operated alternating current generating units connected in parallel comprising, in combination, means for operating a unit on load and another in floating reserve in parallel with any unit on load, means for automatically transferring the reserve unit to load or back to reserve automatically in accordance with a predetermined schedule of economic load distribution between units, and means for manually transferring either unit to reserve or load independently of the automatic control.

28. A control system for a plurality of prime mover operated alternating current generating units connected in parallel comprising, in combination, means whereby units operate on load and in reserve, means for transferring a unit from reserve to load or vice versa, and means for changing the order of transfer whereby the unit normally serving as the load unit is changed to a reserve unit and the unit normally serving as the reserve unit is changed to a load unit.

29. A control system for a plurality of prime mover operated alternating current generating units connected in parallel comprising, in combination, means whereby units operate on load and in reserve, means for transferring a unit from reserve to load or vice versa, and selector switches for changing the order of transfer.

30. A control system for a plurality of prime mover operated alternating current generating units connected in parallel comprising, in combination, means whereby units operate on load and in reserve, means for transferring a unit from reserve to load or vice versa, selector switches for changing the order of transfer, and a protective circuit cooperating with said selector switches whereby upon operation of the selector switches the protective circuit automatically disconnects the automatic control.

31. A control system for a plurality of alternating current generating units connected in parallel, each unit being driven by a hydraulic turbine provided with a draft tube comprising, in combination, means whereby a unit is adapted to be on load and another in reserve, means for transferring the reserve unit to load or back to reserve automatically in accordance with a predetermined load demand, and means for automatically venting the draft tube of a unit when it is transferred to reserve and for closing the vent when the unit is transferred to load.

32. A control system for a plurality of alternating current generating units connected in parallel, each unit being driven by a hydraulic turbine having adjustable gate mechanism, means for operating a unit on load and another in reserve, and means for transferring the reserve unit to load or back to reserve automatically in accordance with a predetermined load demand, including switches and means movable with the gate mechanism for successively closing the switches automatically in accordance with the gate position which gives an indication of the unit output.

33. A control system for a plurality of alternating current generating units connected in parallel, each unit being driven by a hydraulic turbine provided with gate mechanism and a gate operating piston and cylinder motor, comprising, in combination, means whereby a unit is on load and another in reserve, and means for transferring the reserve unit to load or back to reserve automatically in accordance with a predetermined load demand, including a load transfer switch and a reserve transfer switch supported adjacent to the piston rod of the gate operating motor and a cam carried by said rod for sequentially actuating said switches automatically in accordance with the degree of gate opening which is an indication of the unit output.

34. A control system for a plurality of alternating current generating units connected in parallel, each unit being driven by a hydraulic turbine controlled by its individual speed responsive governor which is provided with a motor operated load limit mechanism and a reversible load adjusting or synchronizing motor, a set of relays for the synchronizing motor of each governor, and means for rendering the relays inoperative for the governor of a unit automatically in accordance with a predetermined control of the unit, said latter means being controlled by the load limit mechanism of the latter unit.

35. A control system for a plurality of alternating current generating units connected in parallel, each unit being driven by a hydraulic turbine controlled by its individual speed responsive governor which is provided with a motor operated load limit mechanism and a reversible load adjusting or synchronizing motor, a set of relays for the synchronizing motor of each governor, means for rendering the relays inoperative for the governor of a unit automatically in accordance with a predetermined control of the unit, said latter means being controlled by the load limit mechanism of the latter unit, and means controlled by said load limit mechanism for reestablishing the operativeness of said relays automatically when the unit is subject to a further predetermined control.

36. A control system for a plurality of alternating current generating units connected in parallel, each unit being driven by a hydraulic turbine having its own speed responsive governor which is provided with a reversible synchronizing motor, load control mechanism for effecting actuation of said synchronizing motors, means for transferring a unit from load to reserve or vice versa automatically in accordance with predetermined load conditions, and means whereby, upon transfer of a unit from load to reserve, load control impulses are transmitted from the load control mechanism to the synchronizing motors of each unit but in such directions that the load on the reserve unit is gradually decreased and the load on the remaining units is gradually increased.

37. A control system for a plurality of alternating current generating units connected in parallel, each unit being driven by a hydraulic turbine having its own speed responsive governor which is provided with a reversible synchronizing motor, load control mechanism for effecting actuation of said synchronizing motors, means for transferring a unit from load to reserve or vice versa automatically in accordance with predetermined load conditions, means whereby, upon transfer of a unit from load to reserve, load control impulses are transmitted from the load control mechanism to the synchronizing motors of each unit but in such directions that the load on the reserve unit is gradually decreased and the load on the remaining units is gradually increased, motor operated load limit mechanism for each governor, and means whereby when the load on the reserve unit is decreased to a predetermined small percentage of gate opening the motor operated load limit mechanism functions automatically to disconnect the synchronizing motor of its unit and to shut down the turbine gates through the load limit control.

38. A control system for a plurality of alternating current generating units connected in parallel, each unit being driven by a hydraulic turbine having its own speed responsive governor which is provided with a reversible synchronizing motor, load control mechanism for effecting actuation of said synchronizing motors, means for transferring a unit from load to reserve or vice versa automatically in accordance with predetermined load conditions, means whereby, upon transfer of a unit from load to reserve, load control impulses are transmitted from the load control mechanism to the synchronizing motors of each unit but in such directions that the load on the reserve unit is gradually decreased and the load on the remaining units is gradually increased, motor operated load limit mechanism for each governor, means whereby when the load on the reserve unit is decreased to a predetermined small percentage of gate opening the motor operated load limit mechanism functions automatically to disconnect the synchronizing motor of its unit and to shut down the turbine gates through the load limit control, and means whereby upon transferring the reserve unit to load the motor operated load limit mechanism directly effects the opening of the gate mechanism thereby bringing the unit on load at a faster rate than that at which the unit was transferred to reserve.

39. A control system for a plurality of prime mover operated alternating current generator units normally connected in parallel comprising, in combination, means for operating a unit in reserve while other units are shut down, means for transferring said reserve unit to load automatically upon occurrence of a predetermined load demand, and means for placing one of the shutdown units in reserve automatically when said reserve unit is transferred to load.

S. LOGAN KERR.

CERTIFICATE OF CORRECTION.

Patent No. 2,039,426. May 5, 1936.

SAMUEL LOGAN KERR.

It is hereby certified that error appears in the printed specification of the above numbered patent requiring correction as follows: Page 7, second column, line 9, for the word "units" read unit; page 10, first column, line 50, for the numeral "2" read 1; and line 69, before "relays" insert delay; page 16, first column, line 40, for "reverse" read reserve; and that the said Letters Patent should be read with these corrections therein that the same may conform to the record of the case in the Patent Office.

Signed and sealed this 15th day of September, A. D. 1936.

(Seal)

Henry Van Arsdale
Acting Commissioner of Patents.